(12) United States Patent
Chi et al.

(10) Patent No.: US 12,736,784 B2
(45) Date of Patent: Sep. 15, 2026

(54) IMAGING LENS ASSEMBLY AND ELECTRONIC DEVICE

(71) Applicant: LARGAN PRECISION CO., LTD., Taichung City (TW)

(72) Inventors: Chi-Wei Chi, Taichung City (TW); Chen-Wei Fan, Taichung City (TW); Wei-Fong Hong, Taichung City (TW); Ming-Ta Chou, Taichung City (TW)

(73) Assignee: LARGAN PRECISION CO., LTD., Taichung City (TW)

( * ) Notice: Subject to any disclaimer, the term of this patent is extended or adjusted under 35 U.S.C. 154(b) by 363 days.

(21) Appl. No.: 18/591,154

(22) Filed: Feb. 29, 2024

(65) Prior Publication Data

US 2024/0295721 A1 Sep. 5, 2024

Related U.S. Application Data

(60) Provisional application No. 63/487,624, filed on Mar. 1, 2023.

(30) Foreign Application Priority Data

Nov. 30, 2023 (TW) ................................ 112146689

(51) Int. Cl.
*G02B 13/00* (2006.01)

(52) U.S. Cl.
CPC ................................ *G02B 13/0055* (2013.01)

(58) Field of Classification Search
CPC .... G02B 13/0055; G02B 1/115; G02B 1/118; G02B 13/0065; G02B 1/18; G02B 5/0278; G02B 1/111; H04N 5/65; B60R 1/088; G06F 1/1603
USPC ........................................................ 359/601
See application file for complete search history.

(56) References Cited

U.S. PATENT DOCUMENTS

| | | | |
|---|---|---|---|
| 7,771,832 | B2 | 8/2010 | Nakayama et al. |
| 9,158,039 | B2 | 10/2015 | Okuno |
| 10,539,716 | B2 | 1/2020 | Schulz |
| 10,983,253 | B2 | 4/2021 | Makino |
| 2006/0199040 | A1 | 9/2006 | Yamada |

(Continued)

FOREIGN PATENT DOCUMENTS

| | | | |
|---|---|---|---|
| CN | 101646960 | A | 2/2010 |
| CN | 113031124 | A | 6/2021 |
| EP | 4130835 | A1 | 2/2023 |

*Primary Examiner* — Henry Duong
(74) *Attorney, Agent, or Firm* — McClure, Qualey & Rodack, LLP

(57) ABSTRACT

An imaging lens assembly includes an optical element. The optical element includes a substrate, a nanostructure layer and an intermediate layer. The substrate is made of transparent material. A main component of the nanostructure layer is an aluminum oxide, and the nanostructure layer has a plurality of ridge-like protrusions which extend non-directionally. Each of the ridge-like protrusions is gradually tapered from a bottom of each of the ridge-like protrusions to a top of each of the ridge-like protrusions. The intermediate layer is disposed between the substrate and the nanostructure layer, wherein the intermediate layer includes a first film and a plurality of second films. A main component of the first film is a silicon dioxide, a main component of each of the second films is the silicon dioxide, and the second films are stacked with the first film.

24 Claims, 22 Drawing Sheets

(56) References Cited

U.S. PATENT DOCUMENTS

| | | | | |
|---|---|---|---|---|
| 2009/0022954 | A1 | 1/2009 | Kotani | |
| 2012/0212827 | A1 | 8/2012 | Kakegawa | |
| 2016/0202455 | A1 | 7/2016 | Aschwanden | |
| 2018/0011224 | A1 * | 1/2018 | Takahashi | B32B 7/12 |

* cited by examiner 120
130
131
132d
132c
132b
132a
110
121
Tf2
Tf2
Tf2
Tf2
Tf1
H
Ti

120

IMAGING LENS ASSEMBLY AND ELECTRONIC DEVICE

RELATED APPLICATIONS

This application claims priority to U.S. Provisional Application Ser. No. 63/487,624, filed Mar. 1, 2023, and Taiwan Application Serial Number 112146689, filed Nov. 30, 2023, which are herein incorporated by reference.

BACKGROUND

Technical Field

The present disclosure relates to an imaging lens assembly. More particularly, the present disclosure relates to an imaging lens assembly applicable to portable electronic devices.

Description of Related Art

In recent years, portable electronic devices have developed rapidly. For example, intelligent electronic devices and tablets have been filled in the lives of modern people, and imaging lens assemblies mounted on portable electronic devices have also prospered. However, as the technology advances, the quality requirements of imaging lens assembly are becoming higher and higher.

Specifically, conventional optical elements are configured with a thinner intermediate layer. After the conventional optical elements are placed in a harsh environment for a long time, the structural integrity of ridge-like protrusions of the conventional optical elements is affected, and the antireflective performance is decreased. Further, situations in which the structural integrity of the ridge-like protrusions is affected, such as collapse of the structure, blurring of the boundary between the bottom of the structure and the intermediate layer, or other structural changes that reduce the antireflective performance. Therefore, an imaging lens assembly, which can maintain normal performance in harsh environments, needs to be developed.

SUMMARY

According to one aspect of the present disclosure, an imaging lens assembly includes an optical element. The optical element includes a substrate, a nanostructure layer and an intermediate layer. The substrate is made of transparent material. The nanostructure layer is disposed on a surface of the substrate, wherein a main component of the nanostructure layer is an aluminum oxide, and the nanostructure layer has a plurality of ridge-like protrusions which extend non-directionally. A bottom of each of the ridge-like protrusions is closer to the substrate than a top of each of the ridge-like protrusions to the substrate, and each of the ridge-like protrusions is gradually tapered from the bottom to the top. The intermediate layer is disposed between the substrate and the nanostructure layer, wherein the intermediate layer includes a first film and a plurality of second films. A main component of the first film is a silicon dioxide. A main component of each of the second films is the silicon dioxide, and the second films are stacked with the first film. When a thickness of the first film is Tf1, a thickness of each of the second films is Tf2, and a thickness of the intermediate layer is Ti, the following conditions are satisfied: $Tf2<Tf1$; $45\text{ nm}<Tf1<180\text{ nm}$; and $101\text{ nm}<Ti<450\text{ nm}$.

According to one aspect of the present disclosure, an imaging lens assembly includes an optical element. The optical element includes a substrate, a nanostructure layer and an intermediate layer. The substrate is made of transparent material. The nanostructure layer is disposed on a surface of the substrate, wherein a main component of the nanostructure layer is an aluminum oxide, and the nanostructure layer has a plurality of ridge-like protrusions which extend non-directionally. A bottom of each of the ridge-like protrusions is closer to the substrate than a top of each of the ridge-like protrusions to the substrate, and each of the ridge-like protrusions is gradually tapered from the bottom to the top. The intermediate layer is disposed between the substrate and the nanostructure layer, wherein the intermediate layer includes a plurality of films. A main component of each of the films is a silicon dioxide, and the films are stacked adjacent to each other. When a thickness of the intermediate layer is Ti, the following condition is satisfied: $101\text{ nm}<Ti<450\text{ nm}$.

According to one aspect of the present disclosure, an electronic device includes the imaging lens assembly according to the aforementioned aspect.

According to one aspect of the present disclosure, an electronic device includes the imaging lens assembly according to the aforementioned aspect.

BRIEF DESCRIPTION OF THE DRAWINGS

The present disclosure can be more fully understood by reading the following detailed description of the embodiment, with reference made to the accompanying drawings as follows.

DETAILED DESCRIPTION

Figure 1A:
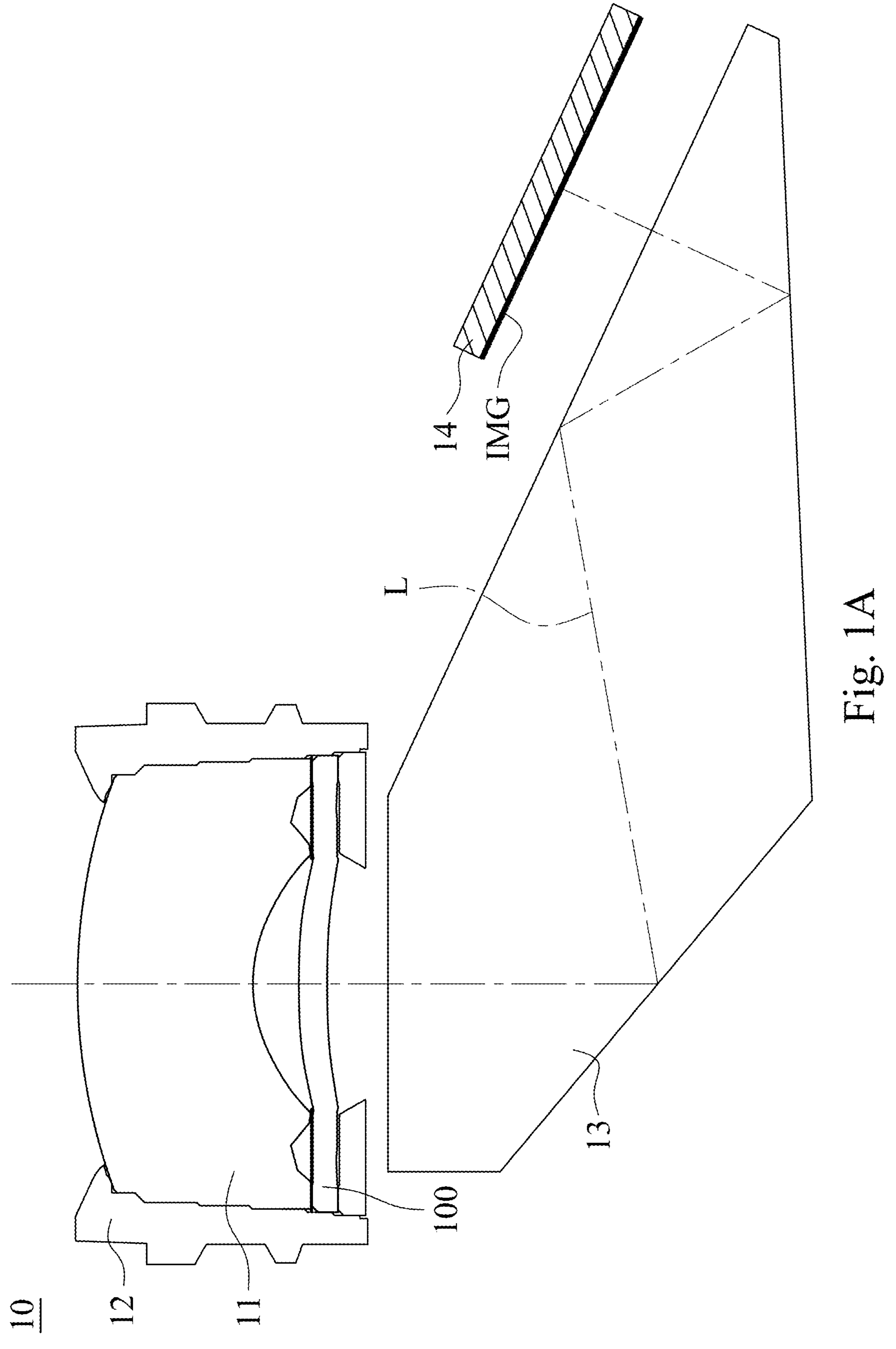
FIG. 1A is a schematic view of an imaging lens assembly according to the 1st example of the present disclosure.

The present disclosure provides an imaging lens assembly including an optical element, wherein the optical element includes a substrate, a nanostructure layer and an intermediate layer. The substrate is made of transparent material. The nanostructure layer is disposed on a surface of the substrate, wherein a main component of the nanostructure layer is an aluminum oxide, and the nanostructure layer has a plurality of ridge-like protrusions which extend non-directionally. A bottom of each of the ridge-like protrusions is closer to the substrate than a top of each of the ridge-like protrusions to the substrate, and each of the ridge-like protrusions is gradually tapered from the bottom to the top. The intermediate layer is disposed between the substrate and the nanostructure layer, wherein the intermediate layer includes a plurality of films. A main component of each of the films is a silicon dioxide ($SiO_2$), and the films are stacked adjacent to each other. When a thickness of the intermediate layer is Ti, the following condition is satisfied: 101 nm<Ti<450 nm. Therefore, the normal performance of the optical element in harsh environments (such as a temperature of 85° C. and a relative humidity of 85%) can be maintained so as to adapt to the growing demand for weather resistance. When the thickness of the intermediate layer satisfies the aforementioned condition, it is favorable for improving the weather resistance of the nanostructure layer. When the intermediate layer is made of stacking multiple layers of silicon dioxide films, it is favorable for avoiding light interference caused by the thickening of the intermediate layer.

Further, the optical element can be a lens element or a light path folding element, and a material of the substrate can be a plastic, a glass or a molding glass, but the present disclosure is not limited thereto. Furthermore, the main component represents that a content of the aforementioned component is greater than 50%.

In detail, the ridge-like protrusions present a ridge-like shape that is wide at the bottom and narrow at the top, which can allow an equivalent refractive index of the nanostructure layer to gradually decrease from the bottom (a foot portion of a mountain-shaped structure) to the top (a top portion of the mountain-shaped structure) so as to avoid a total reflection of a light occurring on the interface. The structure of film layers can be measured by a scanning electron microscope (SEM) or a transmission electron microscope (TEM) depending on the situation, but the present disclosure is not limited thereto.

The films can be a first film and a plurality of second films, wherein a main component of the first film and a main component of each of the second films are a silicon dioxide, and the second films are stacked with the first film. When a thickness of the first film is Tf1, and a thickness of each of the second films is Tf2, the following conditions can be satisfied: Tf2<Tf1; and 45 nm<Tf1<180 nm. Therefore, it is favorable for simplifying the coating process and reducing the impact on the visible light transmittance by disposing the thicker first film and the thinner second films.

The bottom of each of the ridge-like protrusions can be physically contacted with the intermediate layer, and a main component of the ridge-like protrusions is different from a main component of the intermediate layer. Therefore, it is favorable for adjusting the equivalent refractive index of the interface. Further, films made of other materials, such as titanium dioxide ($TiO_2$) films, can be added to the intermediate layer according to circumstances, but the present disclosure is not limited thereto.

A partial area of a top portion of the intermediate layer can be contacted with an air. Specifically, the ridge-like protrusions have tiny pores, so that the partial area of the top portion of the intermediate layer is contacted with the air, and it is favorable for adjusting the equivalent refractive index of the nanostructure layer.

The optical element can be a lens element, and the imaging lens assembly can further include a lens element set. The optical element is closer to an object-side end or an image-side end than the lens element set to the object-side end or the image-side end. Therefore, the optical quality being affected by environmental conditions can be avoided. Specifically, the optical element near the outside is required to have better weather resistance.

The imaging lens assembly can further include a light path folding element, wherein the optical element is closer to the light path folding element than the lens element set to the light path folding element. Therefore, the occurrence of the stray light between the light path folding element and the optical element can be reduced by the configuration of the nanostructure layer.

The substrate of the optical element can include an optical effective portion and a peripheral portion. The optical effective portion has refractive power. The peripheral portion is disposed around the optical effective portion, and a thickness of the intermediate layer corresponding to the optical effective portion is larger than a thickness of the intermediate layer corresponding to the peripheral portion. Therefore, it is favorable for reducing the production time by disposing the thicker first film on the optical effective portion. In detail, the optical effective portion has higher requirements for reflectivity and requires a thicker intermediate layer to protect the nanostructure layer. Further, it is favorable for enhancing the production efficiency by disposing thicker film only on the optical effective portion.

When the thickness of the first film is Tf1, the following condition can be satisfied: 50 nm<Tf1<120 nm. Therefore, it is favorable for maintaining the stability of the nanostructure layer of the optical element in harsh environmental conditions.

When the thickness of the first film is Tf1, and the thickness of each of the second films is Tf2, the following condition can be satisfied: 1.3<Tf1/Tf2<55. Therefore, the occurrence of the film interference can be avoided.

When the thickness of the intermediate layer is Ti, the following condition can be satisfied: 110 nm<Ti<330 nm.

When an average reflectivity of the optical element corresponding to a light with a wavelength from 450 nm to 600 nm is R0, the following condition can be satisfied: R0<0.65%. Therefore, it is favorable for avoiding the production of the stray light from the imaging lens assembly.

When the average reflectivity of the optical element corresponding to the light with the wavelength from 450 nm to 600 nm is R0, and an average reflectivity of the optical element corresponding to the light with the wavelength from 450 nm to 600 nm after the optical element is placed in an environment with a temperature of 85° C. and a relative humidity of 85% for 1000 hours is R1000, the following condition can be satisfied: $1.05<R1000/R0<15$. Therefore, the optical element can still maintain a certain degree of functionality after being placed in harsh environments.

When an average structural height of the nanostructure layer is Havg, the following condition can be satisfied: 70 nm<Havg<350 nm. In detail, the nanostructure layer is viewed under an electron microscope, and at least three or more of the ridge-like protrusions are taken to calculate the average structural height. A structural height of the ridge-like protrusions can be measured by a destructive method. The vertical height of each of the ridge-like protrusions is from an absolute bottom (the foot portion of the mountain-shaped structure) of each of the ridge-like protrusions to the top (the top portion of the mountain-shaped structure) of the ridge-like protrusions when viewed in a cross-section.

Each of the aforementioned features of the imaging lens assembly of the present disclosure can be utilized in numerous combinations so as to achieve the corresponding functionality.

The present disclosure further provides an electronic device including the aforementioned imaging lens assembly.

According to the aforementioned embodiment, the specific examples and reference drawings thereof are given below so as to describe the present disclosure in detail.

1st Example

FIG. 1A is a schematic view of an imaging lens assembly 10 according to the 1st example of the present disclosure. As shown in FIG. 1A, the imaging lens assembly 10 includes an optical element 100, a lens element set 11, a lens barrel 12, a light path folding element 13 and an image sensor 14. The lens barrel 12 is for accommodating the optical element 100 and the lens element set 11. The light path folding element 13 is disposed on an image side of the optical element 100, and the optical element 100 can be closer to the light path folding element 13 than the lens element set 11 to the light path folding element 13. The light path folding element 13 is for folding a light path L. The image sensor 14 is disposed on an image surface IMG of the imaging lens assembly 10. In the 1st example, the imaging lens assembly 10 is a telephoto imaging lens assembly, and the optical element 100 is a lens element.

Further, the optical element 100 can be closer to an image-side end than the lens element set 11 to the image-side end, so that the optical quality being affected by environmental conditions can be avoided. Specifically, the optical element 100 near the outside is required to have better weather resistance.

Figure 1B:
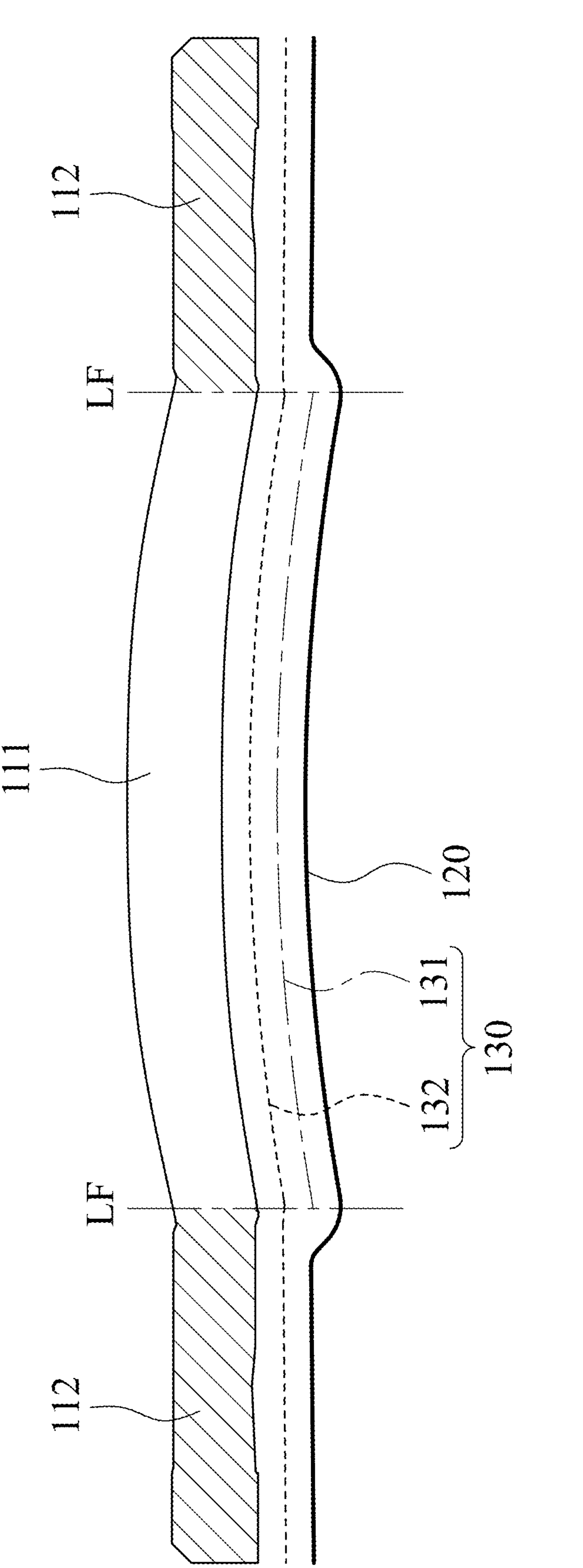
FIG. 1B is a schematic view of an optical element according to the 1st example of FIG. 1A.
Figure 1C:
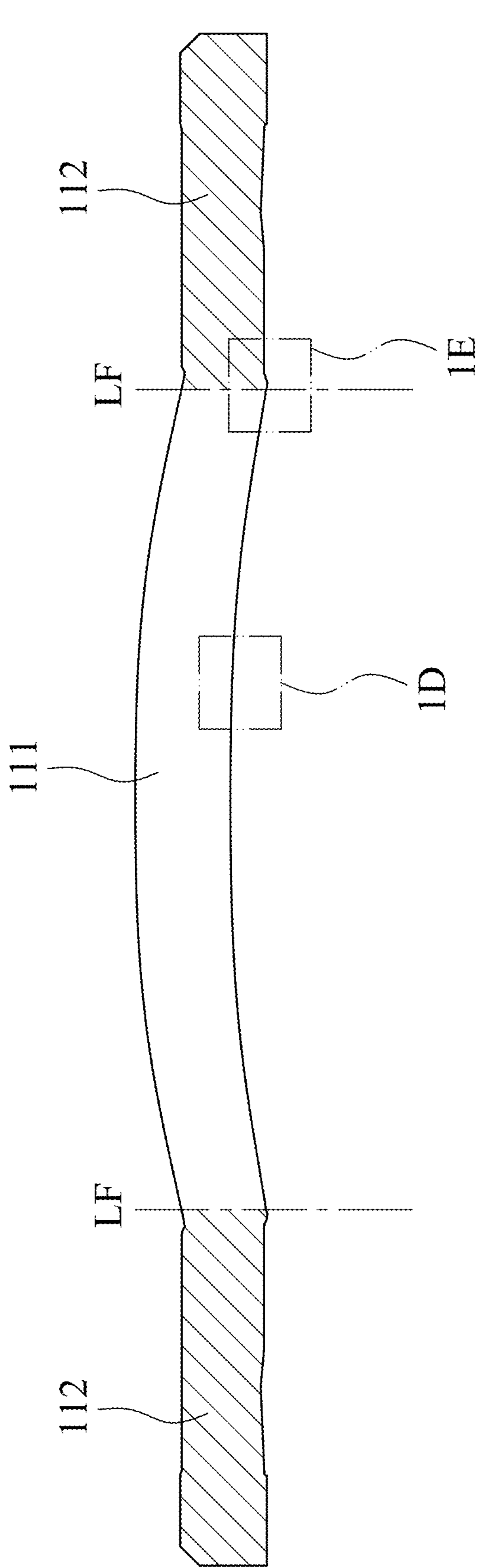
FIG. 1C is a cross-sectional view of the optical element according to the 1st example of FIG. 1A.
Figure 1D:
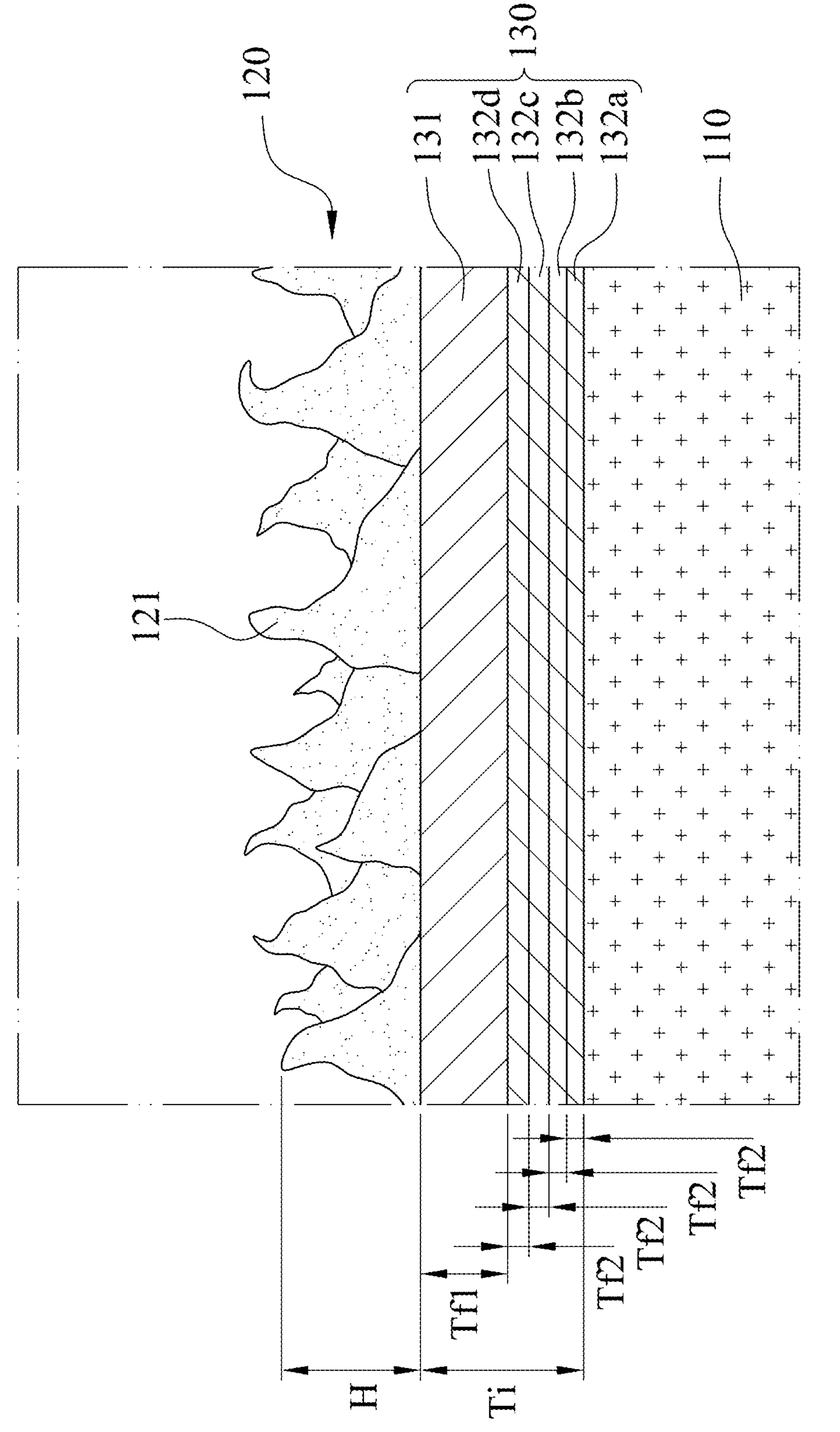
FIG. 1D is a partial enlarged view of the optical element according to the 1st example of FIG. 1C.
Figure 1E:
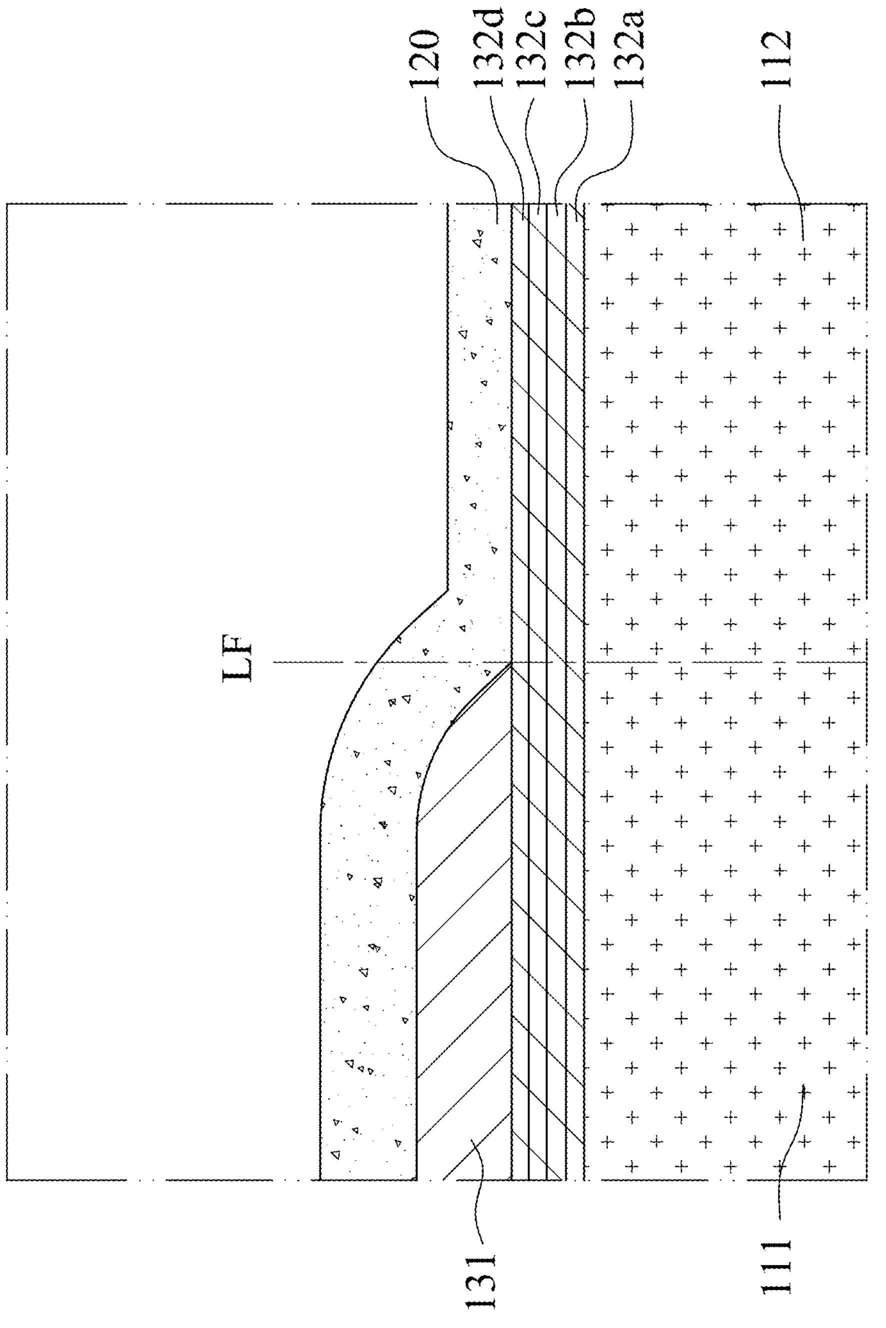
FIG. 1E is another enlarged view of the optical element according to the 1st example of FIG. 1C.
Figure 1F:
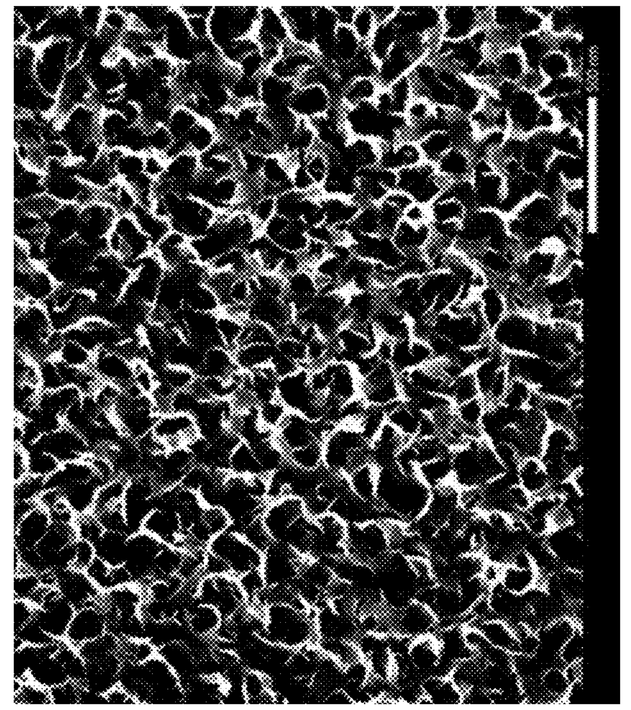
FIG. 1F is a scanning electron microscope image of a nanostructure layer according to the 1st example of FIG. 1B.

FIG. 1B is a schematic view of the optical element 100 according to the 1st example of FIG. 1A. FIG. 1C is a cross-sectional view of the optical element 100 according to the 1st example of FIG. 1A. FIG. 1D is a partial enlarged view of the optical element 100 according to the 1st example of FIG. 1C. FIG. 1E is another enlarged view of the optical element 100 according to the 1st example of FIG. 1C. FIG. 1F is a scanning electron microscope image of a nanostructure layer 120 according to the 1st example of FIG. 1B. As shown in FIG. 1B to FIG. 1F, the optical element 100 includes a substrate 110, a nanostructure layer 120 and an intermediate layer 130. The substrate 110 is made of transparent material, wherein a material of the substrate 110 can be a plastic, a glass or a molding glass, but the present disclosure is not limited thereto. The nanostructure layer 120 is disposed on a surface of the substrate 110, wherein a main component of the nanostructure layer 120 is an aluminum oxide, and the nanostructure layer 120 has a plurality of ridge-like protrusions 121 which extend non-directionally. A bottom of each of the ridge-like protrusions 121 is closer to the substrate 110 than a top of each of the ridge-like protrusions 121 to the substrate 110, and each of the ridge-like protrusions 121 is gradually tapered from the bottom to the top. The intermediate layer 130 is disposed between the substrate 110 and the nanostructure layer 120, wherein the intermediate layer 130 includes a plurality of films. A main component of each of the films is a silicon dioxide, and the films are stacked adjacent to each other. Further, the main component represents that a content of the aforementioned component is greater than 50%. Therefore, the normal performance of the optical element 100 in harsh environments (such as a temperature of 85° C. and a relative humidity of 85%) can be maintained so as to adapt to the growing demand for weather resistance. Further, the stray light between the light path folding element 13 and the optical element 100 can be reduced by the arrangement of the nanostructure layer 120.

In detail, when the intermediate layer 130 is made of stacking multiple layers of silicon dioxide films, it is favorable for avoiding light interference caused by the thickening of the intermediate layer 130.

As shown in FIG. 1B, FIG. 1D and FIG. 1E, the films can be a first film 131 and second films 132, wherein a main component of the first film 131 and a main component of the second films 132 are a silicon dioxide, and the second films 132 are stacked with the first film 131. Further, the second films 132 in FIG. 1B are shown as a whole, and the second films 132 in FIG. 1D and FIG. 1E are respectively shown as four second films 132*a*, 132*b*, 132*c*, 132*d*.

As shown in FIG. 1D, the bottom of each of the ridge-like protrusions 121 is physically contacted with the intermediate layer 130, and a main component of the ridge-like protrusions 121 is different from a main component of the intermediate layer 130. Therefore, it is favorable for adjusting the equivalent refractive index of the interface.

As shown in FIG. 1D and FIG. 1F, a partial area of a top portion of the intermediate layer 130 is contacted with an air. Specifically, the ridge-like protrusions 121 have tiny pores, so that the partial area of the top portion of the intermediate layer 130 is contacted with the air, and it is favorable for adjusting the equivalent refractive index of the interface. In detail, each of the ridge-like protrusions 121 presents a ridge-like shape that is wide at the bottom and narrow at the top, which can allow an equivalent refractive index of the nanostructure layer 120 to gradually decrease from the bottom (a foot portion of a mountain-shaped structure) to the top (a top portion of the mountain-shaped structure) so as to avoid a total reflection of the light occurring on the interface. Further, the structure of film layers can be measured by a scanning electron microscope or a transmission electron microscope depending on the situation, but the present disclosure is not limited thereto.

As shown in FIG. 1B and FIG. 1C, the substrate 110 of the optical element 100 includes an optical effective portion 111 and a peripheral portion 112. The optical effective portion 111 has refractive power. The peripheral portion 112 is disposed around the optical effective portion 111, and a thickness of the intermediate layer 130 corresponding to the optical effective portion 111 is larger than a thickness of the intermediate layer 130 corresponding to the peripheral portion 112. Therefore, it is favorable for reducing the production time. In detail, the optical effective portion 111 has higher requirements for reflectivity and requires a thicker intermediate layer 130 to protect the nanostructure layer 120.

As shown in FIG. 1B, FIG. 1C and FIG. 1E, a virtual line LF is for separating the optical effective portion 111 and the peripheral portion 112 of the substrate 110. Further, as shown in FIG. 1E, the first film 131 is disposed only on the optical effective portion 111 so as to enhance the production efficiency.

As shown in FIG. 1D, when a thickness of the first film 131 is Tf1, a thickness of each of the second films 132*a*, 132*b*, 132*c*, 132*d* is Tf2, a thickness of the intermediate layer 130 is Ti, and a vertical height of the ridge-like protrusions 121 is H, the parameters satisfy the conditions shown in Table 1.

TABLE 1

| the 1st example | |
|---|---|
| Tf1 (nm) | 57.2 |
| Tf2 (nm) (corresponding to the second film 132a) | 18.4 |
| Tf2 (nm) (corresponding to the second film 132b) | 9.0 |
| Tf2 (nm) (corresponding to the second film 132c) | 36.9 |
| Tf2 (nm) (corresponding to the second film 132d) | 3.3 |
| Tf1/Tf2 (corresponding to the second film 132a) | 3.11 |
| Tf1/Tf2 (corresponding to the second film 132b) | 6.36 |
| Tf1/Tf2 (corresponding to the second film 132c) | 1.55 |
| Tf1/Tf2 (corresponding to the second film 132d) | 17.33 |
| Ti (nm) | 124.8 |
| H (nm) | 152.0 |

Further, when an average structural height of the nanostructure layer 120 is Havg, the following condition can be satisfied: 70 nm<Havg<350 nm. It should be mentioned that the nanostructure layer 120 is viewed under an electron microscope, and at least three or more of the ridge-like protrusions 121 are taken to calculate the average structural height. A structural height of the ridge-like protrusions 121 can be measured by a destructive method. The vertical height H of each of the ridge-like protrusions 121 is from an absolute bottom (the foot portion of the mountain-shaped structure) of each of the ridge-like protrusions 121 to the top (the top portion of the mountain-shaped structure) of each of the ridge-like protrusions 121 when viewed in a cross-section.

Figure 1G:
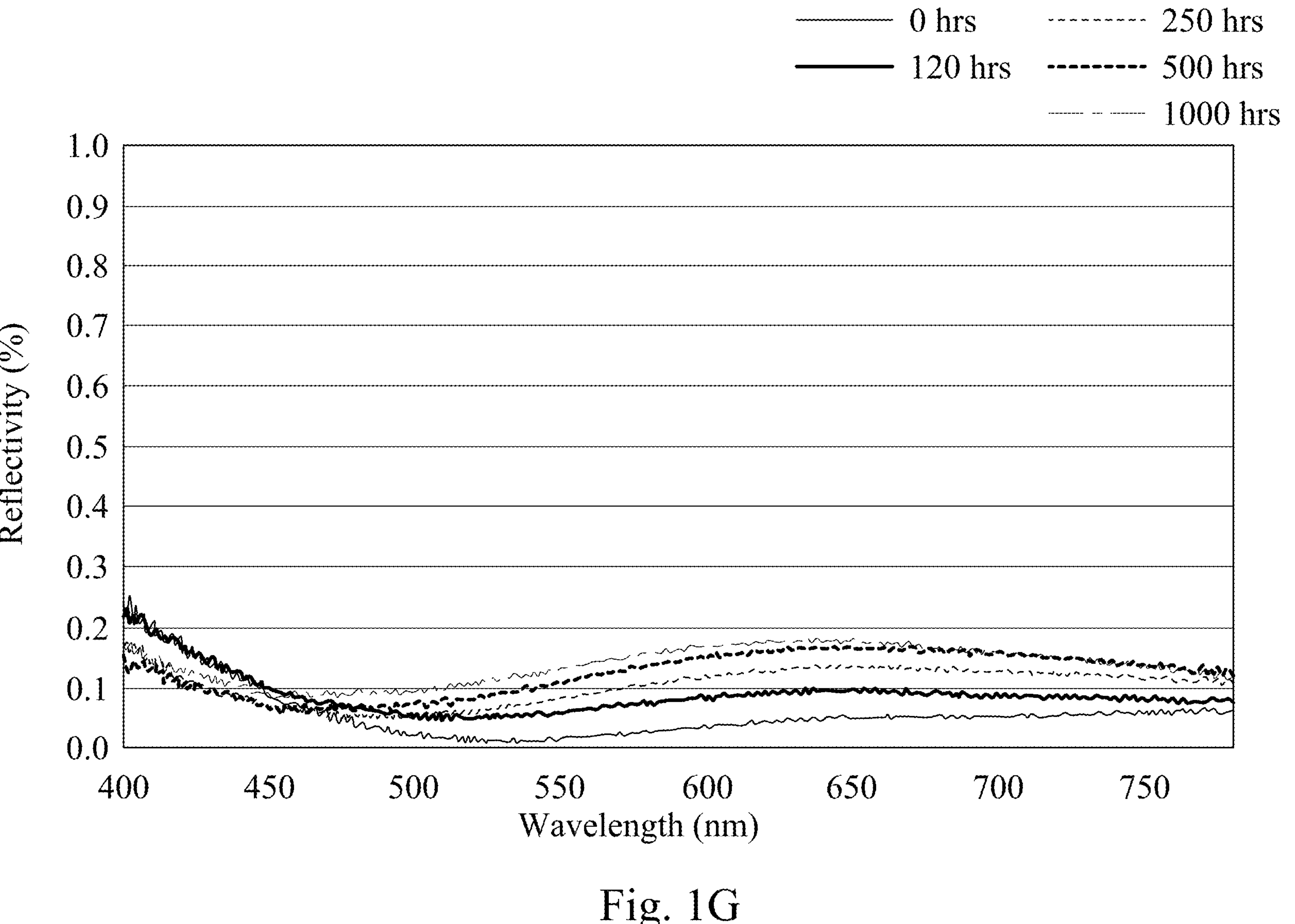
FIG. 1G shows a graph of reflectivity of the optical element according to the 1st example of FIG. 1A in an environment with a temperature of 85° C. and a relative humidity of 85%.

FIG. 1G shows a graph of reflectivity of the optical element 100 according to the 1st example of FIG. 1A in an environment with a temperature of 85° C. and a relative humidity of 85%. Table 2 shows a reflectivity result of the optical element 100 of the 1st example placed in the environment with the temperature of 85° C. and the relative humidity of 85%. Table 3 shows average reflectivities of the optical element 100 of the 1st example at various time points corresponding to a light with the wavelength from 450 nm to 600 nm in the environment with the temperature of 85° C. and the relative humidity of 85%. It should be mentioned that the reflectivity change of the optical element 100 in Table 2 is measured every 10 hours. For clear illustration, only data at some key time points are listed.

TABLE 2

| Wavelength (nm) | Reflectivity at 0 hrs (%) | Reflectivity at 120 hrs (%) | Reflectivity at 250 hrs (%) | Reflectivity at 500 hrs (%) | Reflectivity at 1000 hrs (%) |
|---|---|---|---|---|---|
| 380 | 0.365 | 0.348 | 0.282 | 0.201 | 0.248 |
| 381 | 0.347 | 0.287 | 0.225 | 0.193 | 0.238 |
| 382 | 0.304 | 0.291 | 0.196 | 0.231 | 0.302 |
| 383 | 0.370 | 0.331 | 0.236 | 0.215 | 0.201 |
| 384 | 0.295 | 0.326 | 0.228 | 0.200 | 0.250 |
| 385 | 0.321 | 0.270 | 0.218 | 0.237 | 0.239 |
| 386 | 0.285 | 0.317 | 0.237 | 0.225 | 0.227 |
| 387 | 0.321 | 0.300 | 0.239 | 0.199 | 0.201 |
| 388 | 0.299 | 0.289 | 0.192 | 0.238 | 0.246 |
| 389 | 0.319 | 0.276 | 0.185 | 0.226 | 0.196 |
| 390 | 0.299 | 0.246 | 0.187 | 0.166 | 0.217 |
| 391 | 0.287 | 0.259 | 0.226 | 0.213 | 0.206 |
| 392 | 0.271 | 0.281 | 0.180 | 0.161 | 0.197 |
| 393 | 0.259 | 0.267 | 0.199 | 0.185 | 0.188 |
| 394 | 0.267 | 0.287 | 0.224 | 0.174 | 0.203 |
| 395 | 0.246 | 0.232 | 0.182 | 0.167 | 0.192 |
| 396 | 0.262 | 0.251 | 0.172 | 0.154 | 0.184 |
| 397 | 0.251 | 0.238 | 0.187 | 0.172 | 0.175 |
| 398 | 0.255 | 0.243 | 0.179 | 0.163 | 0.187 |
| 399 | 0.247 | 0.233 | 0.172 | 0.158 | 0.179 |
| 400 | 0.231 | 0.219 | 0.161 | 0.149 | 0.171 |
| 401 | 0.239 | 0.228 | 0.173 | 0.143 | 0.164 |
| 402 | 0.250 | 0.207 | 0.156 | 0.125 | 0.173 |
| 403 | 0.206 | 0.221 | 0.172 | 0.146 | 0.165 |
| 404 | 0.238 | 0.208 | 0.165 | 0.140 | 0.155 |
| 405 | 0.213 | 0.215 | 0.157 | 0.134 | 0.166 |
| 406 | 0.207 | 0.216 | 0.170 | 0.141 | 0.157 |
| 407 | 0.222 | 0.207 | 0.138 | 0.135 | 0.146 |
| 408 | 0.195 | 0.199 | 0.149 | 0.130 | 0.158 |
| 409 | 0.202 | 0.191 | 0.143 | 0.125 | 0.152 |
| 410 | 0.197 | 0.187 | 0.131 | 0.132 | 0.138 |
| 411 | 0.210 | 0.196 | 0.142 | 0.122 | 0.151 |
| 412 | 0.187 | 0.189 | 0.137 | 0.136 | 0.146 |
| 413 | 0.192 | 0.183 | 0.132 | 0.118 | 0.141 |
| 414 | 0.184 | 0.185 | 0.136 | 0.107 | 0.129 |
| 415 | 0.176 | 0.175 | 0.131 | 0.120 | 0.141 |
| 416 | 0.181 | 0.182 | 0.127 | 0.116 | 0.137 |
| 417 | 0.185 | 0.176 | 0.123 | 0.113 | 0.133 |
| 418 | 0.174 | 0.177 | 0.121 | 0.123 | 0.123 |
| 419 | 0.183 | 0.172 | 0.132 | 0.101 | 0.132 |
| 420 | 0.165 | 0.164 | 0.116 | 0.110 | 0.126 |
| 421 | 0.167 | 0.166 | 0.120 | 0.105 | 0.131 |
| 422 | 0.152 | 0.155 | 0.114 | 0.096 | 0.121 |
| 423 | 0.168 | 0.159 | 0.108 | 0.105 | 0.128 |
| 424 | 0.163 | 0.152 | 0.112 | 0.099 | 0.123 |
| 425 | 0.150 | 0.155 | 0.109 | 0.104 | 0.120 |
| 426 | 0.161 | 0.155 | 0.111 | 0.101 | 0.122 |
| 427 | 0.144 | 0.150 | 0.107 | 0.097 | 0.115 |
| 428 | 0.148 | 0.146 | 0.104 | 0.095 | 0.121 |
| 429 | 0.144 | 0.142 | 0.101 | 0.092 | 0.118 |
| 430 | 0.136 | 0.148 | 0.103 | 0.095 | 0.111 |
| 431 | 0.143 | 0.146 | 0.102 | 0.093 | 0.119 |
| 432 | 0.133 | 0.135 | 0.092 | 0.091 | 0.108 |
| 433 | 0.130 | 0.137 | 0.096 | 0.089 | 0.112 |
| 434 | 0.123 | 0.124 | 0.086 | 0.091 | 0.109 |
| 435 | 0.130 | 0.137 | 0.091 | 0.089 | 0.104 |
| 436 | 0.122 | 0.129 | 0.090 | 0.088 | 0.110 |
| 437 | 0.120 | 0.127 | 0.088 | 0.086 | 0.108 |
| 438 | 0.114 | 0.128 | 0.090 | 0.084 | 0.106 |
| 439 | 0.119 | 0.126 | 0.089 | 0.081 | 0.104 |
| 440 | 0.119 | 0.126 | 0.088 | 0.088 | 0.102 |
| 441 | 0.112 | 0.115 | 0.087 | 0.081 | 0.101 |
| 442 | 0.106 | 0.117 | 0.081 | 0.080 | 0.102 |
| 443 | 0.107 | 0.118 | 0.082 | 0.079 | 0.094 |

TABLE 2-continued

| Wave-length (nm) | Reflec-tivity at 0 hrs (%) | Reflec-tivity at 120 hrs (%) | Reflec-tivity at 250 hrs (%) | Reflec-tivity at 500 hrs (%) | Reflec-tivity at 1000 hrs (%) |
|---|---|---|---|---|---|
| 444 | 0.101 | 0.111 | 0.075 | 0.079 | 0.093 |
| 445 | 0.100 | 0.110 | 0.079 | 0.073 | 0.093 |
| 446 | 0.095 | 0.105 | 0.075 | 0.073 | 0.092 |
| 447 | 0.094 | 0.106 | 0.074 | 0.072 | 0.091 |
| 448 | 0.095 | 0.101 | 0.075 | 0.072 | 0.091 |
| 449 | 0.089 | 0.100 | 0.070 | 0.072 | 0.090 |
| 450 | 0.088 | 0.096 | 0.070 | 0.067 | 0.086 |
| 451 | 0.081 | 0.098 | 0.071 | 0.067 | 0.086 |
| 452 | 0.081 | 0.092 | 0.065 | 0.068 | 0.086 |
| 453 | 0.081 | 0.092 | 0.070 | 0.062 | 0.086 |
| 454 | 0.074 | 0.089 | 0.066 | 0.060 | 0.086 |
| 455 | 0.074 | 0.089 | 0.066 | 0.067 | 0.086 |
| 456 | 0.074 | 0.089 | 0.067 | 0.067 | 0.086 |
| 457 | 0.074 | 0.089 | 0.063 | 0.068 | 0.086 |
| 458 | 0.070 | 0.086 | 0.063 | 0.070 | 0.091 |
| 459 | 0.070 | 0.086 | 0.063 | 0.062 | 0.094 |
| 460 | 0.071 | 0.086 | 0.063 | 0.068 | 0.087 |
| 461 | 0.066 | 0.086 | 0.063 | 0.068 | 0.087 |
| 462 | 0.072 | 0.082 | 0.065 | 0.070 | 0.091 |
| 463 | 0.066 | 0.081 | 0.057 | 0.061 | 0.092 |
| 464 | 0.066 | 0.082 | 0.062 | 0.067 | 0.085 |
| 465 | 0.061 | 0.077 | 0.062 | 0.067 | 0.090 |
| 466 | 0.063 | 0.077 | 0.062 | 0.067 | 0.090 |
| 467 | 0.056 | 0.077 | 0.062 | 0.066 | 0.089 |
| 468 | 0.056 | 0.076 | 0.061 | 0.066 | 0.088 |
| 469 | 0.056 | 0.075 | 0.061 | 0.065 | 0.088 |
| 470 | 0.052 | 0.069 | 0.054 | 0.063 | 0.095 |
| 471 | 0.051 | 0.075 | 0.060 | 0.071 | 0.086 |
| 472 | 0.051 | 0.075 | 0.060 | 0.064 | 0.092 |
| 473 | 0.051 | 0.070 | 0.060 | 0.068 | 0.086 |
| 474 | 0.047 | 0.070 | 0.056 | 0.068 | 0.090 |
| 475 | 0.046 | 0.071 | 0.054 | 0.068 | 0.090 |
| 476 | 0.047 | 0.065 | 0.060 | 0.068 | 0.091 |
| 477 | 0.043 | 0.070 | 0.055 | 0.068 | 0.086 |
| 478 | 0.051 | 0.060 | 0.059 | 0.063 | 0.090 |
| 479 | 0.039 | 0.067 | 0.060 | 0.064 | 0.088 |
| 480 | 0.039 | 0.062 | 0.055 | 0.063 | 0.095 |
| 481 | 0.039 | 0.066 | 0.055 | 0.068 | 0.090 |
| 482 | 0.039 | 0.062 | 0.055 | 0.068 | 0.090 |
| 483 | 0.040 | 0.062 | 0.055 | 0.068 | 0.090 |
| 484 | 0.034 | 0.063 | 0.054 | 0.067 | 0.088 |
| 485 | 0.034 | 0.058 | 0.058 | 0.066 | 0.092 |
| 486 | 0.033 | 0.060 | 0.059 | 0.063 | 0.091 |
| 487 | 0.033 | 0.059 | 0.051 | 0.068 | 0.089 |
| 488 | 0.033 | 0.058 | 0.055 | 0.067 | 0.087 |
| 489 | 0.032 | 0.058 | 0.055 | 0.070 | 0.091 |
| 490 | 0.026 | 0.055 | 0.054 | 0.069 | 0.093 |
| 491 | 0.033 | 0.061 | 0.053 | 0.068 | 0.092 |
| 492 | 0.027 | 0.055 | 0.052 | 0.067 | 0.090 |
| 493 | 0.027 | 0.058 | 0.055 | 0.070 | 0.094 |
| 494 | 0.029 | 0.059 | 0.054 | 0.069 | 0.092 |
| 495 | 0.022 | 0.052 | 0.052 | 0.067 | 0.090 |
| 496 | 0.027 | 0.056 | 0.056 | 0.071 | 0.094 |
| 497 | 0.023 | 0.055 | 0.055 | 0.071 | 0.093 |
| 498 | 0.022 | 0.051 | 0.055 | 0.073 | 0.095 |
| 499 | 0.022 | 0.050 | 0.053 | 0.071 | 0.093 |
| 500 | 0.022 | 0.054 | 0.056 | 0.075 | 0.096 |
| 501 | 0.021 | 0.050 | 0.056 | 0.074 | 0.095 |
| 502 | 0.023 | 0.050 | 0.053 | 0.075 | 0.097 |
| 503 | 0.017 | 0.055 | 0.057 | 0.068 | 0.095 |
| 504 | 0.021 | 0.051 | 0.057 | 0.071 | 0.098 |
| 505 | 0.020 | 0.050 | 0.056 | 0.071 | 0.097 |
| 506 | 0.017 | 0.054 | 0.058 | 0.076 | 0.099 |
| 507 | 0.017 | 0.048 | 0.056 | 0.074 | 0.097 |
| 508 | 0.017 | 0.052 | 0.060 | 0.078 | 0.100 |
| 509 | 0.017 | 0.048 | 0.059 | 0.073 | 0.099 |
| 510 | 0.016 | 0.050 | 0.056 | 0.080 | 0.099 |
| 511 | 0.016 | 0.049 | 0.060 | 0.074 | 0.101 |
| 512 | 0.016 | 0.048 | 0.060 | 0.073 | 0.104 |
| 513 | 0.016 | 0.051 | 0.056 | 0.079 | 0.103 |
| 514 | 0.017 | 0.050 | 0.060 | 0.080 | 0.103 |
| 515 | 0.012 | 0.050 | 0.060 | 0.080 | 0.107 |
| 516 | 0.016 | 0.049 | 0.059 | 0.079 | 0.105 |
| 517 | 0.013 | 0.048 | 0.061 | 0.081 | 0.104 |
| 518 | 0.017 | 0.050 | 0.059 | 0.078 | 0.108 |

TABLE 2-continued

| Wave-length (nm) | Reflec-tivity at 0 hrs (%) | Reflec-tivity at 120 hrs (%) | Reflec-tivity at 250 hrs (%) | Reflec-tivity at 500 hrs (%) | Reflec-tivity at 1000 hrs (%) |
|---|---|---|---|---|---|
| 519 | 0.011 | 0.050 | 0.062 | 0.081 | 0.106 |
| 520 | 0.015 | 0.049 | 0.061 | 0.080 | 0.108 |
| 521 | 0.012 | 0.051 | 0.060 | 0.082 | 0.110 |
| 522 | 0.012 | 0.049 | 0.064 | 0.086 | 0.105 |
| 523 | 0.013 | 0.052 | 0.063 | 0.085 | 0.112 |
| 524 | 0.009 | 0.051 | 0.065 | 0.083 | 0.110 |
| 525 | 0.012 | 0.051 | 0.064 | 0.086 | 0.110 |
| 526 | 0.011 | 0.052 | 0.065 | 0.089 | 0.111 |
| 527 | 0.011 | 0.051 | 0.064 | 0.088 | 0.115 |
| 528 | 0.011 | 0.053 | 0.066 | 0.090 | 0.112 |
| 529 | 0.011 | 0.050 | 0.068 | 0.089 | 0.114 |
| 530 | 0.011 | 0.051 | 0.069 | 0.093 | 0.116 |
| 531 | 0.011 | 0.053 | 0.066 | 0.089 | 0.118 |
| 532 | 0.011 | 0.053 | 0.072 | 0.095 | 0.117 |
| 533 | 0.010 | 0.052 | 0.069 | 0.092 | 0.116 |
| 534 | 0.014 | 0.053 | 0.072 | 0.093 | 0.121 |
| 535 | 0.009 | 0.052 | 0.070 | 0.096 | 0.120 |
| 536 | 0.012 | 0.054 | 0.072 | 0.095 | 0.119 |
| 537 | 0.012 | 0.054 | 0.072 | 0.096 | 0.120 |
| 538 | 0.012 | 0.055 | 0.071 | 0.100 | 0.122 |
| 539 | 0.012 | 0.055 | 0.073 | 0.099 | 0.121 |
| 540 | 0.012 | 0.052 | 0.075 | 0.098 | 0.122 |
| 541 | 0.012 | 0.054 | 0.075 | 0.099 | 0.124 |
| 542 | 0.011 | 0.058 | 0.076 | 0.099 | 0.120 |
| 543 | 0.011 | 0.054 | 0.074 | 0.101 | 0.126 |
| 544 | 0.011 | 0.056 | 0.076 | 0.103 | 0.125 |
| 545 | 0.013 | 0.056 | 0.078 | 0.102 | 0.126 |
| 546 | 0.016 | 0.056 | 0.078 | 0.104 | 0.129 |
| 547 | 0.013 | 0.058 | 0.079 | 0.106 | 0.127 |
| 548 | 0.012 | 0.058 | 0.081 | 0.108 | 0.131 |
| 549 | 0.015 | 0.059 | 0.081 | 0.107 | 0.131 |
| 550 | 0.016 | 0.059 | 0.084 | 0.109 | 0.134 |
| 551 | 0.016 | 0.057 | 0.083 | 0.112 | 0.132 |
| 552 | 0.016 | 0.062 | 0.085 | 0.111 | 0.134 |
| 553 | 0.016 | 0.061 | 0.084 | 0.113 | 0.134 |
| 554 | 0.018 | 0.063 | 0.085 | 0.113 | 0.137 |
| 555 | 0.018 | 0.062 | 0.086 | 0.115 | 0.135 |
| 556 | 0.018 | 0.062 | 0.088 | 0.117 | 0.138 |
| 557 | 0.018 | 0.064 | 0.088 | 0.116 | 0.137 |
| 558 | 0.019 | 0.062 | 0.089 | 0.116 | 0.137 |
| 559 | 0.019 | 0.065 | 0.089 | 0.119 | 0.139 |
| 560 | 0.019 | 0.065 | 0.091 | 0.118 | 0.141 |
| 561 | 0.019 | 0.065 | 0.090 | 0.120 | 0.141 |
| 562 | 0.021 | 0.065 | 0.091 | 0.122 | 0.141 |
| 563 | 0.021 | 0.068 | 0.094 | 0.121 | 0.144 |
| 564 | 0.021 | 0.068 | 0.093 | 0.123 | 0.143 |
| 565 | 0.021 | 0.067 | 0.095 | 0.123 | 0.147 |
| 566 | 0.022 | 0.069 | 0.096 | 0.125 | 0.146 |
| 567 | 0.022 | 0.069 | 0.096 | 0.124 | 0.149 |
| 568 | 0.022 | 0.069 | 0.097 | 0.127 | 0.147 |
| 569 | 0.022 | 0.069 | 0.097 | 0.127 | 0.147 |
| 570 | 0.025 | 0.072 | 0.099 | 0.127 | 0.148 |
| 571 | 0.023 | 0.069 | 0.097 | 0.128 | 0.148 |
| 572 | 0.022 | 0.070 | 0.099 | 0.128 | 0.149 |
| 573 | 0.025 | 0.072 | 0.100 | 0.131 | 0.150 |
| 574 | 0.025 | 0.073 | 0.101 | 0.133 | 0.152 |
| 575 | 0.025 | 0.073 | 0.102 | 0.132 | 0.151 |
| 576 | 0.025 | 0.075 | 0.104 | 0.133 | 0.153 |
| 577 | 0.025 | 0.073 | 0.102 | 0.134 | 0.154 |
| 578 | 0.025 | 0.076 | 0.105 | 0.135 | 0.158 |
| 579 | 0.028 | 0.073 | 0.105 | 0.136 | 0.155 |
| 580 | 0.025 | 0.076 | 0.105 | 0.135 | 0.158 |
| 581 | 0.028 | 0.074 | 0.108 | 0.138 | 0.156 |
| 582 | 0.028 | 0.074 | 0.107 | 0.137 | 0.157 |
| 583 | 0.028 | 0.077 | 0.107 | 0.138 | 0.158 |
| 584 | 0.028 | 0.077 | 0.107 | 0.138 | 0.159 |
| 585 | 0.028 | 0.078 | 0.110 | 0.141 | 0.159 |
| 586 | 0.027 | 0.078 | 0.108 | 0.142 | 0.165 |
| 587 | 0.031 | 0.079 | 0.112 | 0.143 | 0.158 |
| 588 | 0.031 | 0.079 | 0.109 | 0.143 | 0.161 |
| 589 | 0.031 | 0.079 | 0.112 | 0.141 | 0.162 |
| 590 | 0.031 | 0.080 | 0.113 | 0.144 | 0.163 |
| 591 | 0.030 | 0.080 | 0.113 | 0.145 | 0.164 |
| 592 | 0.033 | 0.080 | 0.114 | 0.145 | 0.162 |
| 593 | 0.033 | 0.080 | 0.114 | 0.146 | 0.165 |

TABLE 2-continued

| Wave-length (nm) | Reflec-tivity at 0 hrs (%) | Reflec-tivity at 120 hrs (%) | Reflec-tivity at 250 hrs (%) | Reflec-tivity at 500 hrs (%) | Reflec-tivity at 1000 hrs (%) |
|---|---|---|---|---|---|
| 594 | 0.034 | 0.081 | 0.115 | 0.147 | 0.166 |
| 595 | 0.034 | 0.081 | 0.115 | 0.147 | 0.166 |
| 596 | 0.034 | 0.081 | 0.115 | 0.148 | 0.167 |
| 597 | 0.034 | 0.082 | 0.116 | 0.148 | 0.167 |
| 598 | 0.033 | 0.085 | 0.115 | 0.150 | 0.169 |
| 599 | 0.037 | 0.082 | 0.120 | 0.147 | 0.166 |
| 600 | 0.034 | 0.083 | 0.118 | 0.151 | 0.170 |
| 601 | 0.035 | 0.084 | 0.119 | 0.152 | 0.169 |
| 602 | 0.037 | 0.081 | 0.119 | 0.153 | 0.168 |
| 603 | 0.037 | 0.085 | 0.120 | 0.156 | 0.169 |
| 604 | 0.037 | 0.086 | 0.122 | 0.150 | 0.171 |
| 605 | 0.038 | 0.086 | 0.120 | 0.154 | 0.170 |
| 606 | 0.038 | 0.088 | 0.122 | 0.154 | 0.173 |
| 607 | 0.038 | 0.086 | 0.123 | 0.155 | 0.170 |
| 608 | 0.039 | 0.086 | 0.121 | 0.153 | 0.172 |
| 609 | 0.039 | 0.087 | 0.122 | 0.154 | 0.172 |
| 610 | 0.039 | 0.086 | 0.123 | 0.155 | 0.172 |
| 611 | 0.039 | 0.086 | 0.124 | 0.156 | 0.173 |
| 612 | 0.040 | 0.086 | 0.125 | 0.157 | 0.174 |
| 613 | 0.040 | 0.087 | 0.125 | 0.156 | 0.175 |
| 614 | 0.039 | 0.091 | 0.126 | 0.155 | 0.173 |
| 615 | 0.044 | 0.088 | 0.127 | 0.160 | 0.174 |
| 616 | 0.040 | 0.088 | 0.128 | 0.161 | 0.176 |
| 617 | 0.043 | 0.091 | 0.129 | 0.159 | 0.174 |
| 618 | 0.043 | 0.089 | 0.127 | 0.160 | 0.176 |
| 619 | 0.044 | 0.090 | 0.128 | 0.161 | 0.173 |
| 620 | 0.044 | 0.091 | 0.129 | 0.163 | 0.178 |
| 621 | 0.044 | 0.089 | 0.129 | 0.160 | 0.175 |
| 622 | 0.041 | 0.092 | 0.128 | 0.161 | 0.176 |
| 623 | 0.045 | 0.093 | 0.128 | 0.161 | 0.177 |
| 624 | 0.045 | 0.090 | 0.128 | 0.163 | 0.178 |
| 625 | 0.045 | 0.093 | 0.132 | 0.161 | 0.176 |
| 626 | 0.044 | 0.095 | 0.130 | 0.160 | 0.177 |
| 627 | 0.049 | 0.092 | 0.131 | 0.166 | 0.179 |
| 628 | 0.046 | 0.092 | 0.131 | 0.163 | 0.176 |
| 629 | 0.046 | 0.090 | 0.132 | 0.164 | 0.177 |
| 630 | 0.046 | 0.093 | 0.133 | 0.160 | 0.178 |
| 631 | 0.045 | 0.094 | 0.133 | 0.165 | 0.178 |
| 632 | 0.049 | 0.091 | 0.134 | 0.166 | 0.179 |
| 633 | 0.047 | 0.094 | 0.132 | 0.164 | 0.180 |
| 634 | 0.047 | 0.096 | 0.133 | 0.165 | 0.184 |
| 635 | 0.046 | 0.092 | 0.132 | 0.166 | 0.176 |
| 636 | 0.050 | 0.096 | 0.136 | 0.166 | 0.176 |
| 637 | 0.050 | 0.093 | 0.134 | 0.166 | 0.177 |
| 638 | 0.047 | 0.093 | 0.136 | 0.169 | 0.184 |
| 639 | 0.048 | 0.094 | 0.132 | 0.165 | 0.174 |
| 640 | 0.047 | 0.094 | 0.133 | 0.165 | 0.179 |
| 641 | 0.051 | 0.094 | 0.133 | 0.166 | 0.177 |
| 642 | 0.048 | 0.095 | 0.134 | 0.166 | 0.177 |
| 643 | 0.048 | 0.095 | 0.135 | 0.168 | 0.178 |
| 644 | 0.048 | 0.095 | 0.132 | 0.164 | 0.179 |
| 645 | 0.051 | 0.096 | 0.135 | 0.168 | 0.177 |
| 646 | 0.052 | 0.095 | 0.134 | 0.167 | 0.174 |
| 647 | 0.053 | 0.094 | 0.133 | 0.166 | 0.177 |
| 648 | 0.049 | 0.094 | 0.134 | 0.167 | 0.179 |
| 649 | 0.049 | 0.095 | 0.134 | 0.167 | 0.176 |
| 650 | 0.049 | 0.095 | 0.135 | 0.165 | 0.181 |
| 651 | 0.050 | 0.096 | 0.135 | 0.165 | 0.178 |
| 652 | 0.050 | 0.093 | 0.136 | 0.166 | 0.174 |
| 653 | 0.050 | 0.093 | 0.134 | 0.167 | 0.178 |
| 654 | 0.050 | 0.097 | 0.134 | 0.162 | 0.175 |
| 655 | 0.050 | 0.094 | 0.134 | 0.168 | 0.177 |
| 656 | 0.050 | 0.094 | 0.134 | 0.165 | 0.173 |
| 657 | 0.050 | 0.094 | 0.135 | 0.165 | 0.174 |
| 658 | 0.051 | 0.096 | 0.131 | 0.166 | 0.174 |
| 659 | 0.051 | 0.091 | 0.135 | 0.166 | 0.175 |
| 660 | 0.051 | 0.095 | 0.136 | 0.166 | 0.172 |
| 661 | 0.051 | 0.092 | 0.133 | 0.166 | 0.172 |
| 662 | 0.052 | 0.093 | 0.135 | 0.162 | 0.177 |
| 663 | 0.047 | 0.093 | 0.130 | 0.168 | 0.173 |
| 664 | 0.051 | 0.093 | 0.134 | 0.164 | 0.173 |
| 665 | 0.051 | 0.093 | 0.132 | 0.165 | 0.173 |
| 666 | 0.051 | 0.091 | 0.136 | 0.165 | 0.170 |
| 667 | 0.051 | 0.090 | 0.132 | 0.165 | 0.170 |
| 668 | 0.051 | 0.094 | 0.132 | 0.165 | 0.174 |

TABLE 2-continued

| Wave-length (nm) | Reflec-tivity at 0 hrs (%) | Reflec-tivity at 120 hrs (%) | Reflec-tivity at 250 hrs (%) | Reflec-tivity at 500 hrs (%) | Reflec-tivity at 1000 hrs (%) |
|---|---|---|---|---|---|
| 669 | 0.051 | 0.091 | 0.132 | 0.165 | 0.171 |
| 670 | 0.051 | 0.087 | 0.133 | 0.163 | 0.178 |
| 671 | 0.052 | 0.091 | 0.134 | 0.163 | 0.167 |
| 672 | 0.051 | 0.091 | 0.130 | 0.163 | 0.172 |
| 673 | 0.052 | 0.091 | 0.133 | 0.163 | 0.169 |
| 674 | 0.052 | 0.089 | 0.135 | 0.159 | 0.171 |
| 675 | 0.052 | 0.089 | 0.131 | 0.165 | 0.165 |
| 676 | 0.052 | 0.089 | 0.131 | 0.161 | 0.170 |
| 677 | 0.052 | 0.089 | 0.128 | 0.161 | 0.167 |
| 678 | 0.052 | 0.092 | 0.131 | 0.161 | 0.167 |
| 679 | 0.052 | 0.093 | 0.131 | 0.161 | 0.167 |
| 680 | 0.052 | 0.089 | 0.131 | 0.162 | 0.167 |
| 681 | 0.052 | 0.089 | 0.131 | 0.159 | 0.167 |
| 682 | 0.048 | 0.090 | 0.127 | 0.157 | 0.165 |
| 683 | 0.052 | 0.091 | 0.132 | 0.162 | 0.165 |
| 684 | 0.052 | 0.087 | 0.132 | 0.162 | 0.165 |
| 685 | 0.052 | 0.090 | 0.132 | 0.159 | 0.165 |
| 686 | 0.048 | 0.086 | 0.129 | 0.159 | 0.165 |
| 687 | 0.052 | 0.090 | 0.129 | 0.159 | 0.166 |
| 688 | 0.052 | 0.090 | 0.129 | 0.159 | 0.162 |
| 689 | 0.052 | 0.087 | 0.129 | 0.159 | 0.162 |
| 690 | 0.048 | 0.089 | 0.131 | 0.155 | 0.162 |
| 691 | 0.052 | 0.084 | 0.126 | 0.161 | 0.163 |
| 692 | 0.052 | 0.088 | 0.130 | 0.157 | 0.159 |
| 693 | 0.052 | 0.085 | 0.127 | 0.157 | 0.162 |
| 694 | 0.052 | 0.083 | 0.127 | 0.157 | 0.158 |
| 695 | 0.052 | 0.088 | 0.127 | 0.157 | 0.163 |
| 696 | 0.052 | 0.088 | 0.127 | 0.157 | 0.163 |
| 697 | 0.052 | 0.085 | 0.127 | 0.154 | 0.160 |
| 698 | 0.052 | 0.083 | 0.127 | 0.159 | 0.159 |
| 699 | 0.053 | 0.089 | 0.127 | 0.154 | 0.160 |
| 700 | 0.053 | 0.085 | 0.127 | 0.154 | 0.160 |
| 701 | 0.053 | 0.085 | 0.128 | 0.154 | 0.157 |
| 702 | 0.053 | 0.090 | 0.128 | 0.154 | 0.157 |
| 703 | 0.053 | 0.085 | 0.129 | 0.154 | 0.157 |
| 704 | 0.053 | 0.086 | 0.126 | 0.155 | 0.158 |
| 705 | 0.053 | 0.086 | 0.123 | 0.155 | 0.155 |
| 706 | 0.053 | 0.087 | 0.126 | 0.152 | 0.160 |
| 707 | 0.053 | 0.082 | 0.126 | 0.152 | 0.155 |
| 708 | 0.053 | 0.086 | 0.126 | 0.153 | 0.155 |
| 709 | 0.053 | 0.086 | 0.127 | 0.153 | 0.156 |
| 710 | 0.051 | 0.086 | 0.128 | 0.151 | 0.155 |
| 711 | 0.057 | 0.086 | 0.122 | 0.156 | 0.155 |
| 712 | 0.053 | 0.085 | 0.125 | 0.151 | 0.154 |
| 713 | 0.052 | 0.085 | 0.125 | 0.151 | 0.153 |
| 714 | 0.052 | 0.086 | 0.124 | 0.150 | 0.153 |
| 715 | 0.052 | 0.082 | 0.124 | 0.150 | 0.154 |
| 716 | 0.052 | 0.082 | 0.124 | 0.151 | 0.149 |
| 717 | 0.053 | 0.085 | 0.125 | 0.149 | 0.154 |
| 718 | 0.053 | 0.084 | 0.124 | 0.152 | 0.149 |
| 719 | 0.054 | 0.084 | 0.126 | 0.149 | 0.152 |
| 720 | 0.054 | 0.086 | 0.124 | 0.151 | 0.150 |
| 721 | 0.055 | 0.084 | 0.122 | 0.149 | 0.151 |
| 722 | 0.056 | 0.085 | 0.125 | 0.148 | 0.152 |
| 723 | 0.057 | 0.087 | 0.122 | 0.150 | 0.148 |
| 724 | 0.054 | 0.083 | 0.124 | 0.147 | 0.150 |
| 725 | 0.054 | 0.084 | 0.122 | 0.149 | 0.148 |
| 726 | 0.055 | 0.087 | 0.125 | 0.147 | 0.146 |
| 727 | 0.055 | 0.083 | 0.121 | 0.149 | 0.148 |
| 728 | 0.056 | 0.083 | 0.122 | 0.146 | 0.145 |
| 729 | 0.056 | 0.084 | 0.123 | 0.143 | 0.146 |
| 730 | 0.057 | 0.082 | 0.121 | 0.145 | 0.142 |
| 731 | 0.057 | 0.082 | 0.122 | 0.147 | 0.150 |
| 732 | 0.058 | 0.083 | 0.123 | 0.143 | 0.146 |
| 733 | 0.058 | 0.084 | 0.120 | 0.144 | 0.147 |
| 734 | 0.061 | 0.086 | 0.124 | 0.143 | 0.144 |
| 735 | 0.056 | 0.082 | 0.119 | 0.143 | 0.139 |
| 736 | 0.056 | 0.083 | 0.120 | 0.145 | 0.141 |
| 737 | 0.057 | 0.083 | 0.121 | 0.142 | 0.137 |
| 738 | 0.057 | 0.081 | 0.119 | 0.145 | 0.139 |
| 739 | 0.056 | 0.082 | 0.121 | 0.141 | 0.140 |
| 740 | 0.061 | 0.083 | 0.117 | 0.142 | 0.141 |
| 741 | 0.062 | 0.079 | 0.118 | 0.143 | 0.142 |
| 742 | 0.059 | 0.078 | 0.119 | 0.140 | 0.139 |
| 743 | 0.061 | 0.085 | 0.122 | 0.142 | 0.141 |

TABLE 2-continued

| Wave-length (nm) | Reflec-tivity at 0 hrs (%) | Reflec-tivity at 120 hrs (%) | Reflec-tivity at 250 hrs (%) | Reflec-tivity at 500 hrs (%) | Reflec-tivity at 1000 hrs (%) |
|---|---|---|---|---|---|
| 744 | 0.056 | 0.081 | 0.118 | 0.144 | 0.143 |
| 745 | 0.057 | 0.082 | 0.119 | 0.140 | 0.139 |
| 746 | 0.057 | 0.085 | 0.117 | 0.144 | 0.136 |
| 747 | 0.056 | 0.080 | 0.119 | 0.140 | 0.139 |
| 748 | 0.063 | 0.081 | 0.115 | 0.136 | 0.135 |
| 749 | 0.059 | 0.082 | 0.116 | 0.137 | 0.136 |
| 750 | 0.062 | 0.079 | 0.114 | 0.135 | 0.134 |
| 751 | 0.055 | 0.080 | 0.115 | 0.136 | 0.135 |
| 752 | 0.061 | 0.080 | 0.116 | 0.138 | 0.137 |
| 753 | 0.057 | 0.081 | 0.117 | 0.134 | 0.133 |
| 754 | 0.056 | 0.084 | 0.114 | 0.136 | 0.137 |
| 755 | 0.064 | 0.079 | 0.115 | 0.137 | 0.131 |
| 756 | 0.059 | 0.079 | 0.116 | 0.139 | 0.132 |
| 757 | 0.059 | 0.080 | 0.117 | 0.135 | 0.134 |
| 758 | 0.063 | 0.077 | 0.117 | 0.132 | 0.133 |
| 759 | 0.055 | 0.078 | 0.112 | 0.134 | 0.128 |
| 760 | 0.061 | 0.080 | 0.114 | 0.136 | 0.129 |
| 761 | 0.062 | 0.076 | 0.110 | 0.133 | 0.130 |
| 762 | 0.063 | 0.077 | 0.112 | 0.129 | 0.128 |
| 763 | 0.065 | 0.079 | 0.114 | 0.132 | 0.130 |
| 764 | 0.060 | 0.074 | 0.110 | 0.127 | 0.125 |
| 765 | 0.060 | 0.075 | 0.111 | 0.129 | 0.127 |
| 766 | 0.064 | 0.076 | 0.108 | 0.126 | 0.124 |
| 767 | 0.057 | 0.077 | 0.109 | 0.127 | 0.125 |
| 768 | 0.058 | 0.077 | 0.110 | 0.128 | 0.127 |
| 769 | 0.059 | 0.078 | 0.112 | 0.130 | 0.123 |
| 770 | 0.064 | 0.075 | 0.113 | 0.134 | 0.128 |
| 771 | 0.067 | 0.076 | 0.116 | 0.128 | 0.121 |
| 772 | 0.061 | 0.077 | 0.112 | 0.130 | 0.122 |
| 773 | 0.062 | 0.078 | 0.108 | 0.126 | 0.124 |
| 774 | 0.065 | 0.081 | 0.109 | 0.128 | 0.120 |
| 775 | 0.058 | 0.075 | 0.112 | 0.131 | 0.121 |
| 776 | 0.059 | 0.076 | 0.107 | 0.125 | 0.123 |
| 777 | 0.060 | 0.077 | 0.108 | 0.127 | 0.124 |
| 778 | 0.060 | 0.077 | 0.109 | 0.131 | 0.115 |
| 779 | 0.061 | 0.080 | 0.113 | 0.127 | 0.116 |
| 780 | 0.062 | 0.074 | 0.107 | 0.119 | 0.117 |

TABLE 3

| | 0 hrs | 120 hrs | 250 hrs | 500 hrs | 1000 hrs |
|---|---|---|---|---|---|
| Average reflectivity (%) | 0.030 | 0.065 | 0.076 | 0.095 | 0.118 |

As shown in Table 3, when the average reflectivity of the optical element 100 corresponding to the light with the wavelength from 450 nm to 600 nm is R0 (that is, the value of 0 hrs), and the average reflectivity of the optical element 100 corresponding to the light with the wavelength from 450 nm to 600 nm after the optical element 100 is placed in the environment with the temperature of 85° C. and the relative humidity of 85% for 1000 hours is R1000 (that is, the value of 1000 hrs), R1000/R0 is 3.977. Further, after the optical element 100 is placed in the environment with the temperature of 85° C. and the relative humidity of 85% for 120 hours, 250 hours and 500 hours, the average reflectivities of the optical element 100 corresponding to the light with the wavelength from 450 nm to 600 nm are the value of 120 hrs, the value of 250 hrs, and the value of 500 hrs, respectively.

It should be mentioned that a range of the peripheral portion 112 in FIG. 1B and FIG. 1C is represented by a shading so as to distinguish the optical effective portion 111 and the peripheral portion 112. Further, the arrangement relationship of the nanostructure layer 120, the first film 131 and the second films 132 in FIG. 1B is represented by different line segments, the thickness of the film layers in FIG. 1D is not drawn according to the actual ratio of the film layers, and it is only for illustrating the configuration of the film layers.

2nd Example

Figure 2:
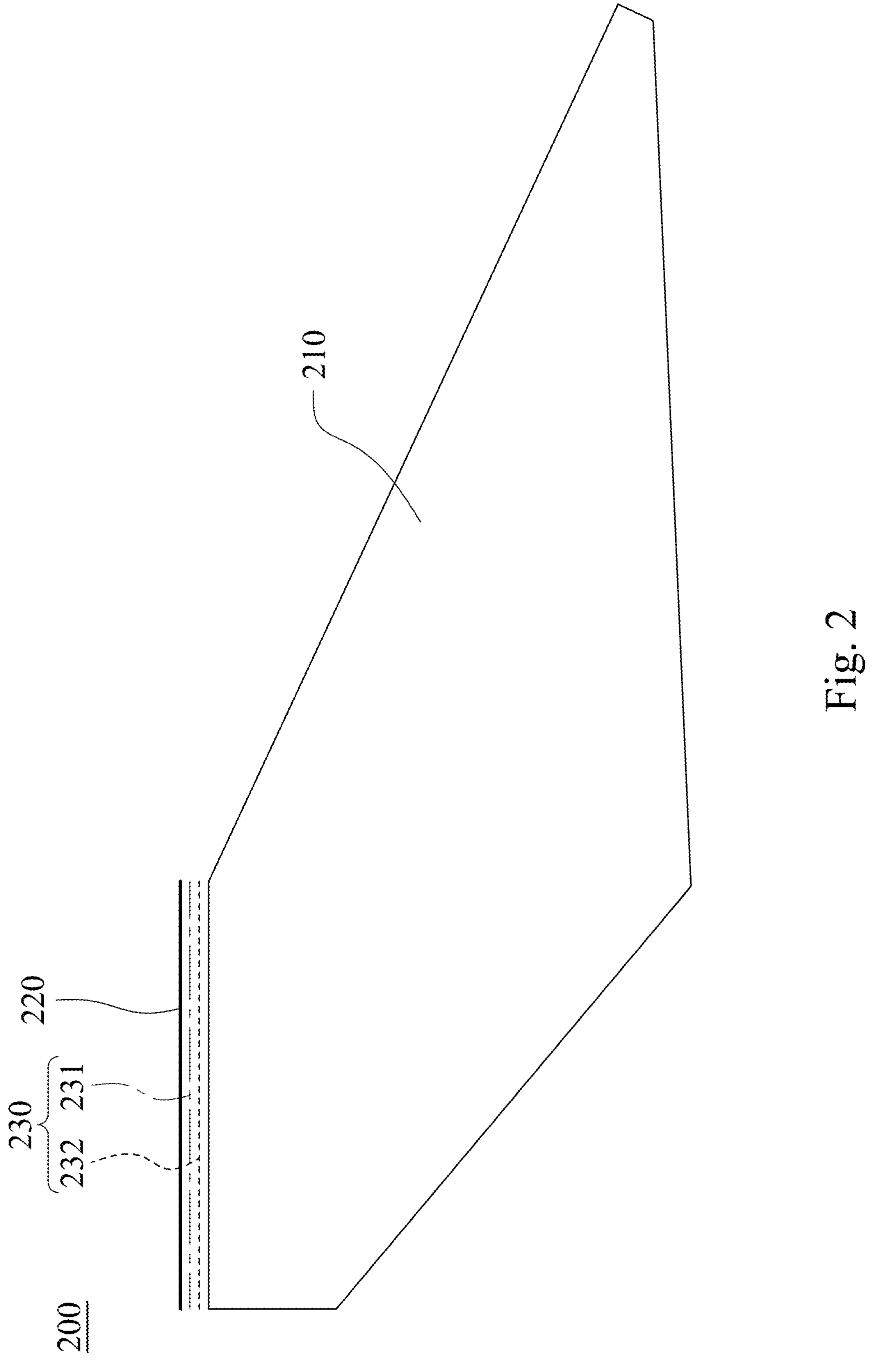
FIG. 2 is a schematic view of an optical element according to the 2nd example of the present disclosure.

FIG. 2 is a schematic view of an optical element 200 according to the 2nd example of the present disclosure. As shown in FIG. 2, the optical element 200 includes a substrate 210, a nanostructure layer 220 and an intermediate layer 230. The substrate 210 is made of transparent material. The nanostructure layer 220 is disposed on a surface of the substrate 210, wherein a main component of the nanostructure layer 220 is an aluminum oxide, and the nanostructure layer 220 has a plurality of ridge-like protrusions (not shown) which extend non-directionally. A bottom of each of the ridge-like protrusions is closer to the substrate 210 than a top of each of the ridge-like protrusions to the substrate 210, and each of the ridge-like protrusions is gradually tapered from the bottom to the top. The intermediate layer 230 is disposed between the substrate 210 and the nanostructure layer 220, wherein the intermediate layer 230 includes a first film 231 and a plurality of second films 232. A main component of the first film 231 and a main component of the second films 232 are a silicon dioxide, and the second films 232 are stacked with the first film 231.

Further, the optical element 200 of the 2nd example is a light path folding element and is for folding a light path, and the optical element 200 can be applied to the imaging lens assembly 10 of the 1st example.

It should be mentioned that the arrangement relationship of the nanostructure layer 220, the first film 231 and the second films 232 in FIG. 2 is represented by different line segments, wherein the second films 232 are shown as a whole, and a number of the second films 232 can be four.

Furthermore, all of other structures and dispositions according to the 2nd example are the same as the structures and the dispositions according to the 1st example, and will not be described again herein.

3rd Example

Figure 3A:
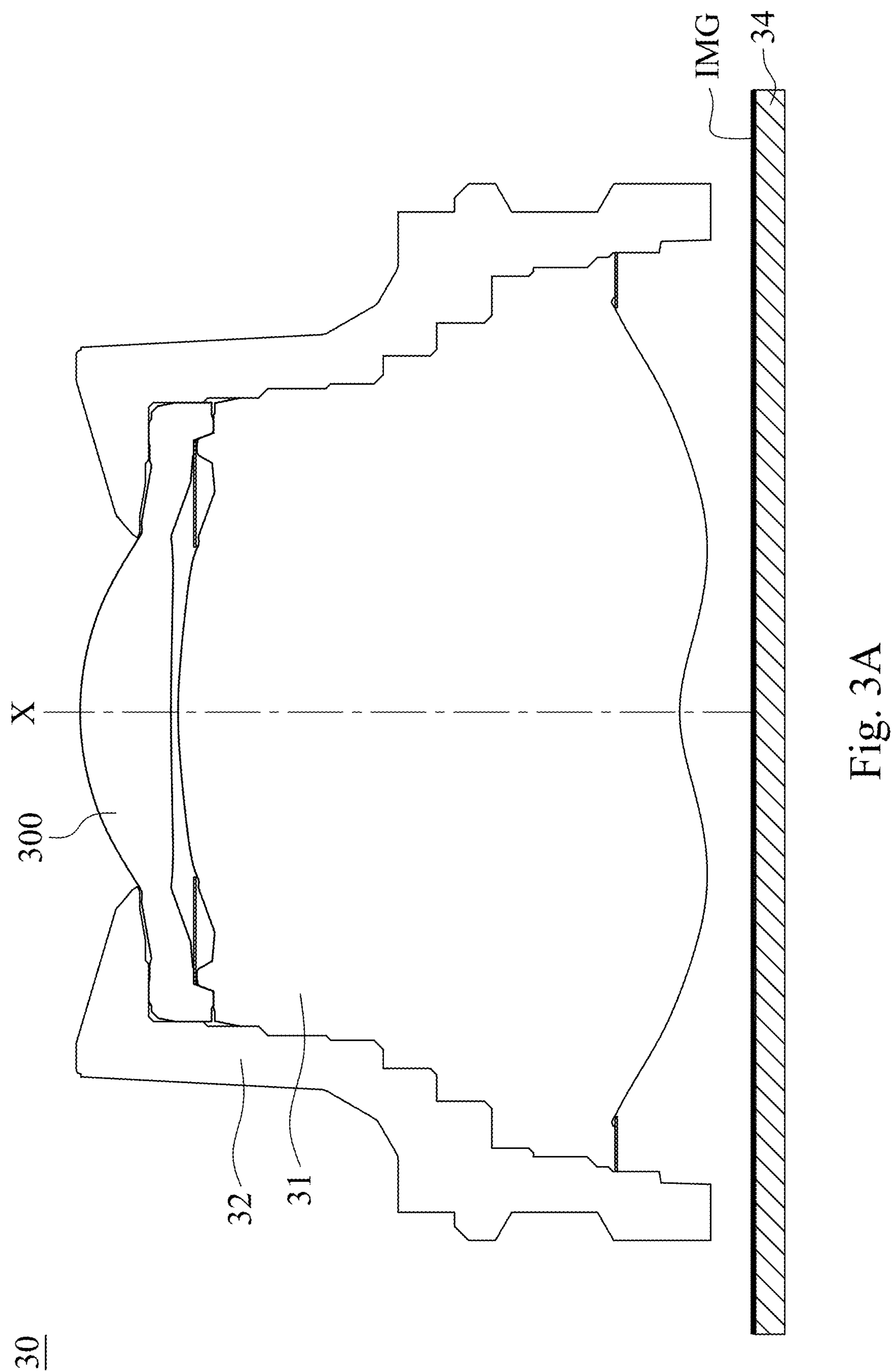
FIG. 3A is a schematic view of an imaging lens assembly according to the 3rd example of the present disclosure.

FIG. 3A is a schematic view of an imaging lens assembly 30 according to the 3rd example of the present disclosure. As shown in FIG. 3A, the imaging lens assembly 30 has an optical axis X and includes an optical element 300, a lens element set 31, a lens barrel 32 and an image sensor 34. The lens barrel 32 is for accommodating the optical element 300 and the lens element set 31. The image sensor 34 is disposed on an image surface IMG of the imaging lens assembly 30. In the 3rd example, the imaging lens assembly 30 is a wide-angle imaging lens assembly, the optical element 300 is a lens element, and the optical element 300 can be closer to an object-side than the lens element set 31 to the object-side end.

Figure 3B:
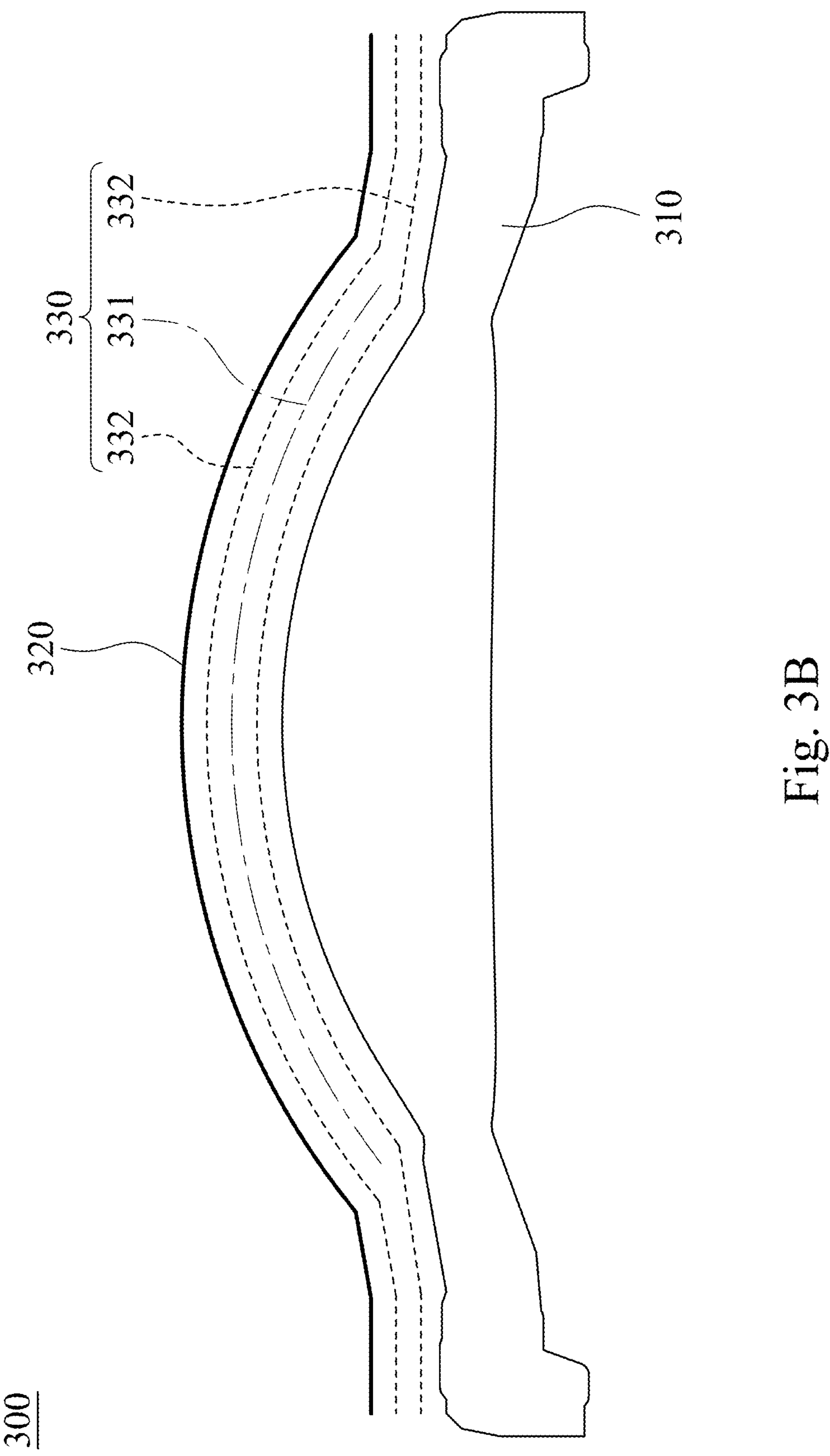
FIG. 3B is a schematic view of an optical element according to the 3rd example of FIG. 3A.
Figure 3C:
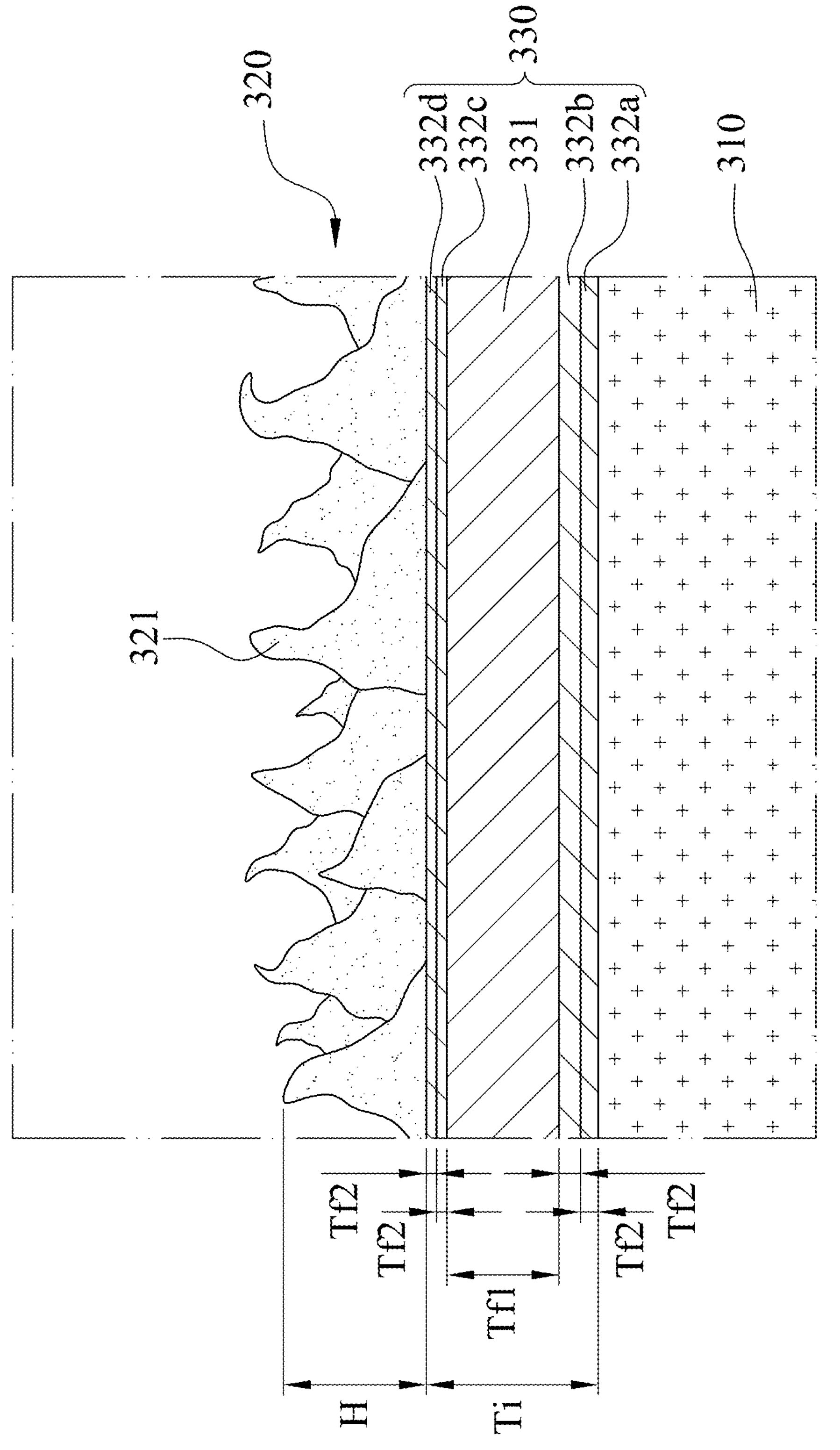
FIG. 3C is a partial enlarged view of the optical element according to the 3rd example of FIG. 3A.

FIG. 3B is a schematic view of the optical element 300 according to the 3rd example of FIG. 3A. FIG. 3C is a partial enlarged view of the optical element 300 according to the 3rd example of FIG. 3A. As shown in FIG. 3B and FIG. 3C, the optical element 300 includes a substrate 310, a nanostructure layer 320 and an intermediate layer 330. The substrate 310 is made of transparent material. The nanostructure layer 320 is disposed on a surface of the substrate 310, wherein a main component of the nanostructure layer 320 is an aluminum oxide, and the nanostructure layer 320 has a plurality of ridge-like protrusions 321 which extend non-directionally. A bottom of each of the ridge-like protrusions 321 is closer to the substrate 310 than a top of each of the ridge-like protrusions 321 to the substrate 310, and each of the ridge-like protrusions 321 is gradually tapered from the bottom to the top. The intermediate layer 330 is disposed between the substrate 310 and the nanostructure layer 320, wherein the intermediate layer 330 includes a plurality of films. A main component of each of the films is a silicon dioxide, and the films are stacked adjacent to each other.

Further, the films can be a first film 331 and second films 332, wherein a main component of the first film 331 and a main component of the second films 332 are both the silicon dioxide, and the second films 332 are stacked with the first film 331. Furthermore, the second films 332 in FIG. 3B are shown as a whole, the second films 332 in FIG. 3C are respectively shown as four second films 332*a*, 332*b*, 332*c*, 332*d*, and the first film 331 is disposed between the second film 332*b* and the second film 332*c*.

As shown in FIG. 3C, the bottom of each of the ridge-like protrusions 321 is physically contacted with the intermediate layer 330, a main component of the ridge-like protrusions 321 is different from a main component of the intermediate layer 330, and a partial area of a top portion of the intermediate layer 330 is contacted with an air.

In the 3rd example, when a thickness of the first film 331 is Tf1, a thickness of each of the second films 332*a*, 332*b*, 332*c*, 332*d* is Tf2, a thickness of the intermediate layer 330 is Ti, and a vertical height of the ridge-like protrusions 321 is H, the parameters satisfy the conditions shown in Table 4.

TABLE 4

| the 3rd example | |
|---|---|
| Tf1 (nm) | 68.1 |
| Tf2 (nm) (corresponding to the second film 332a) | 20.3 |
| Tf2 (nm) (corresponding to the second film 332b) | 7.1 |
| Tf2 (nm) (corresponding to the second film 332c) | 2.7 |
| Tf2 (nm) (corresponding to the second film 332d) | 2.1 |
| Tf1/Tf2 (corresponding to the second film 332a) | 3.35 |
| Tf1/Tf2 (corresponding to the second film 332b) | 9.59 |
| Tf1/Tf2 (corresponding to the second film 332c) | 25.22 |
| Tf1/Tf2 (corresponding to the second film 332d) | 32.43 |
| Ti (nm) | 100.3 |
| H (nm) | 147.3 |

Further, when an average structural height of the nanostructure layer 320 is Havg, the following condition can be satisfied: 70 nm<Havg<350 nm.

It should be mentioned that the arrangement relationship of the nanostructure layer 320, the first film 331 and the second films 332 in FIG. 3B is represented by different line segments, the thickness of the film layers in FIG. 3C is not drawn according to the actual ratio of the film layers, it is only for illustrating the configuration of the film layers, and the configuration of the film layers can be adjusted according to the situations.

4th Example

Figure 4A:
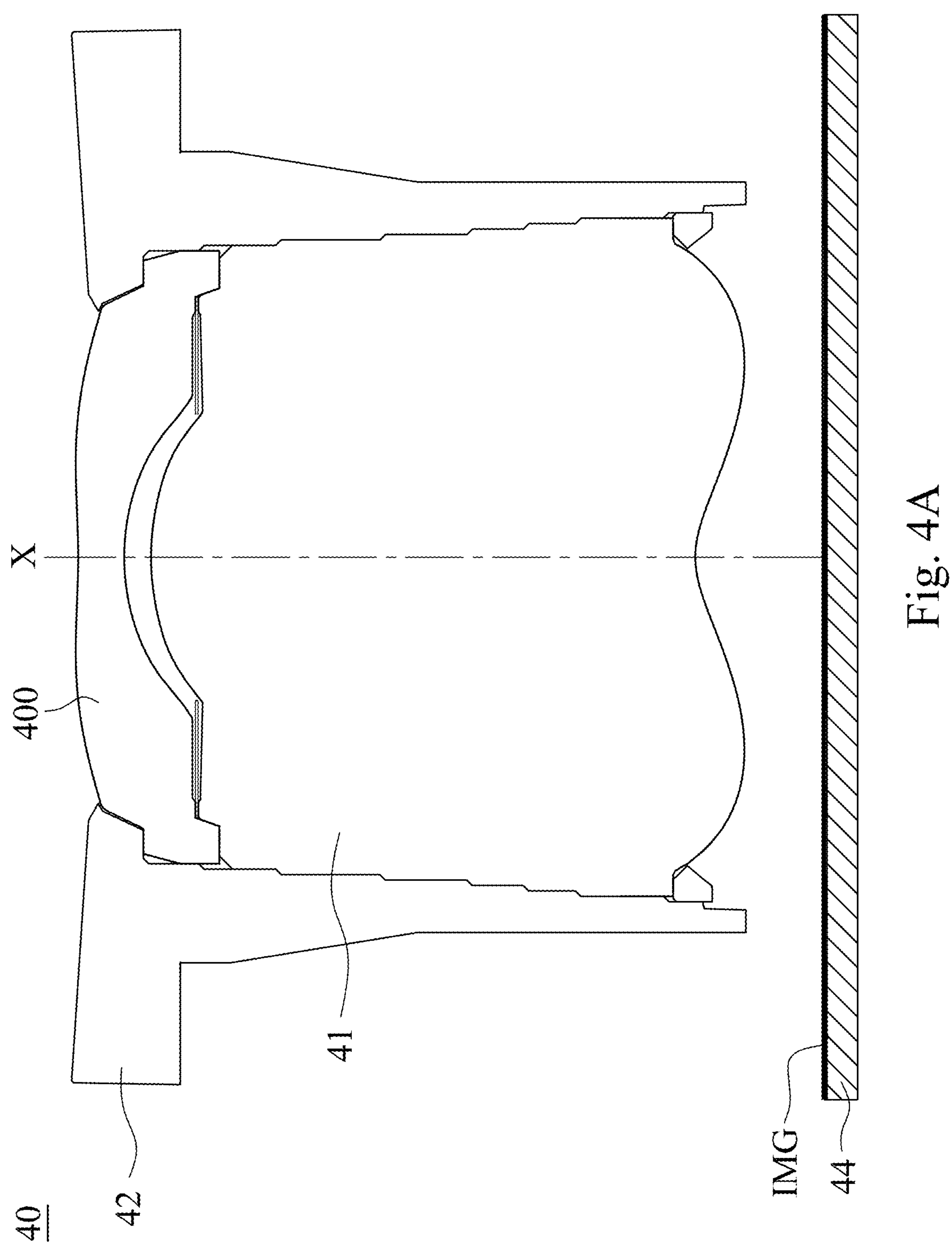
FIG. 4A is a schematic view of an imaging lens assembly according to the 4th example of the present disclosure.

FIG. 4A is a schematic view of an imaging lens assembly 40 according to the 4th example of the present disclosure. As shown in FIG. 4A, the imaging lens assembly 40 has an optical axis X and includes an optical element 400, a lens element set 41, a lens barrel 42 and an image sensor 44. The lens barrel 42 is for accommodating the optical element 400 and the lens element set 41, and the image sensor 44 is disposed on an image surface IMG of the imaging lens assembly 40. In the 4th example, the imaging lens assembly 40 is an ultra-wide-angle imaging lens assembly, the optical element 400 is a lens element, and the optical element 400 can be closer to an object-side than the lens element set 41 to the object-side end.

Figure 4B:
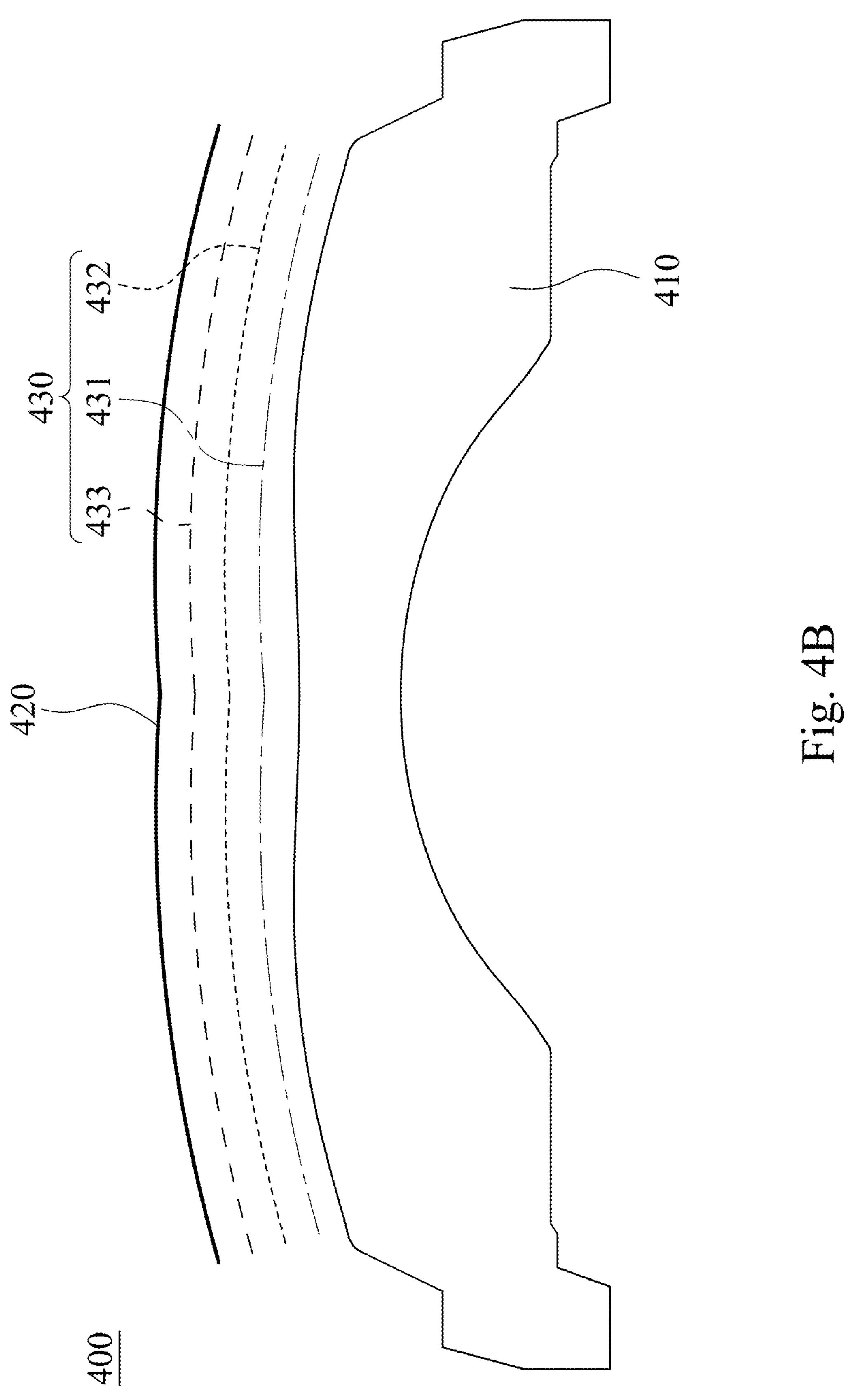
FIG. 4B is a schematic view of an optical element according to the 4th example of FIG. 4A.

FIG. 4B is a schematic view of the optical element 400 according to the 4th example of FIG. 4A. As shown in FIG. 4B, the optical element 400 includes a substrate 410, a nanostructure layer 420 and an intermediate layer 430. The substrate 410 is made of transparent material. The nanostructure layer 420 is disposed on a surface of the substrate 410, wherein a main component of the nanostructure layer 420 is an aluminum oxide, and the nanostructure layer 420 has a plurality of ridge-like protrusions (not shown) which extend non-directionally. A bottom of each of the ridge-like protrusions is closer to the substrate 410 than a top of each of the ridge-like protrusions to the substrate 410, and each of the ridge-like protrusions is gradually tapered from the bottom to the top. The intermediate layer 430 is disposed between the substrate 410 and the nanostructure layer 420, wherein the intermediate layer 430 includes a plurality of films. A main component of each of the films is a silicon dioxide, and the films are stacked adjacent to each other.

Further, the films can be a first film 431 and second films 432, wherein a main component of the first film 431 and a main component of the second films 432 are both the silicon dioxide, and the second films 432 are stacked with the first film 431. Furthermore, the second films 432 in FIG. 4B are shown as a whole, and a number of the second films 432 is three.

Moreover, the intermediate layer 430 can further include a titanium oxide film 433 according to different situations, wherein the titanium oxide film 433 is disposed between the nanostructure layer 420 and the second films 432.

In the 4th example, when a thickness of the first film 431 is Tf1, a thickness of each of the second films 432 is Tf2, a thickness of the intermediate layer 430 is Ti, a vertical height of the ridge-like protrusions is H, and a thickness of the titanium oxide film 433 is Tt, the parameters satisfy the conditions shown in Table 5. Further, parameter markings of the 4th example can be referred to FIG. 1D and FIG. 3C. In Table 5, the second films 432 corresponding to the upper, middle, and lower respectively represent the second film 432 in contact with the titanium oxide film 433, the second film 432 disposed in the middle, and the second film 432 in contact with the first film 431.

TABLE 5

| the 4th example | |
|---|---|
| Tf1 (nm) | 53.5 |
| Tf2 (nm) (upper) | 18.4 |

TABLE 5-continued

| the 4th example | |
|---|---|
| Tf2 (nm) (middle) | 16.2 |
| Tf2 (nm) (lower) | 17.8 |
| Tf1/Tf2 (upper) | 2.91 |
| Tf1/Tf2 (middle) | 3.30 |
| Tf1/Tf2 (lower) | 3.01 |
| Ti (nm) | 127.0 |
| H (nm) | 233.0 |
| Tt (nm) | 21.1 |

It should be mentioned that the arrangement relationship of the nanostructure layer 420, the first film 431, the second films 432 and the titanium oxide film 433 in FIG. 4B is represented by different line segments.

5th Example

Figure 5A:
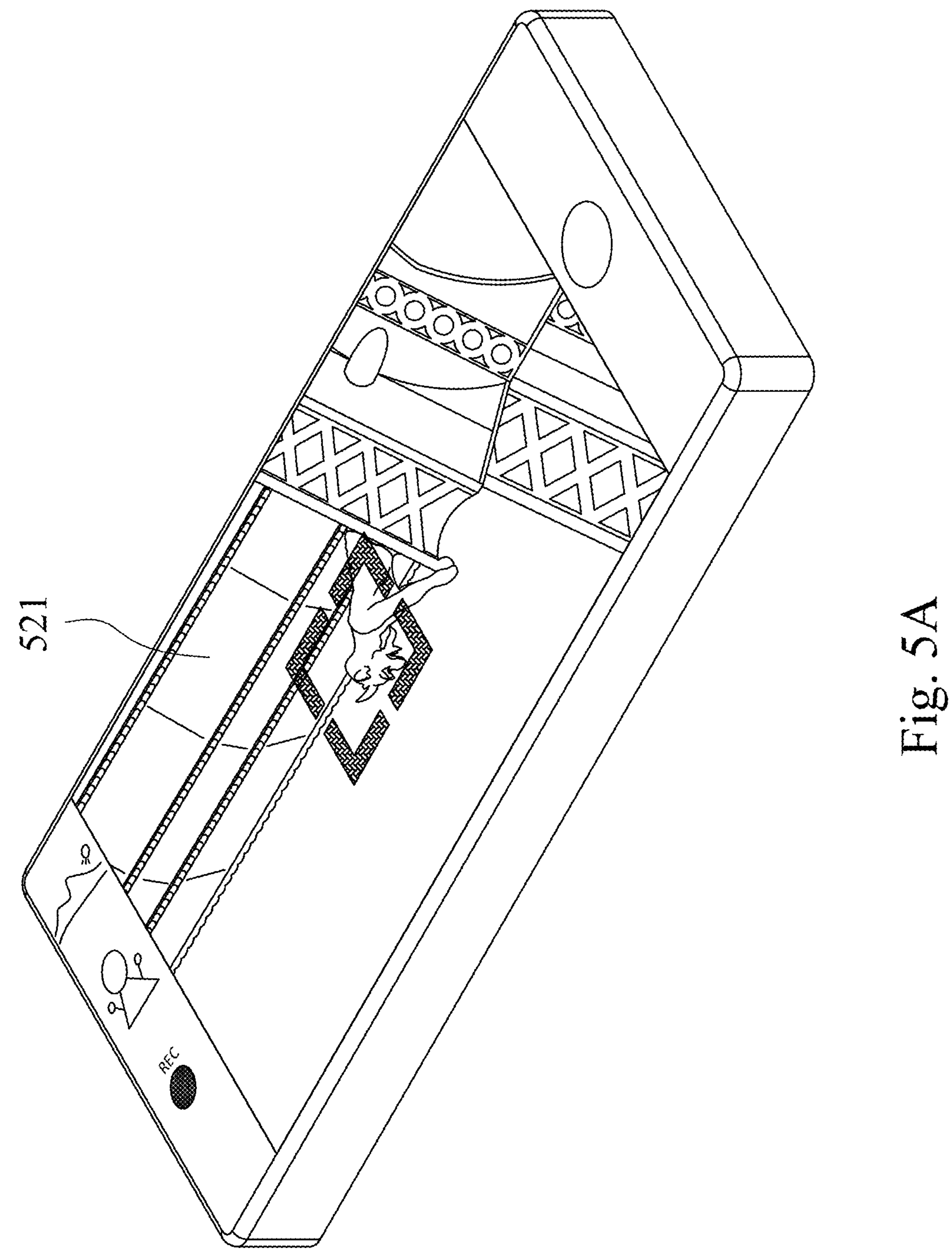
FIG. 5A is a schematic view of an electronic device according to the 5th example of the present disclosure.
Figure 5B:
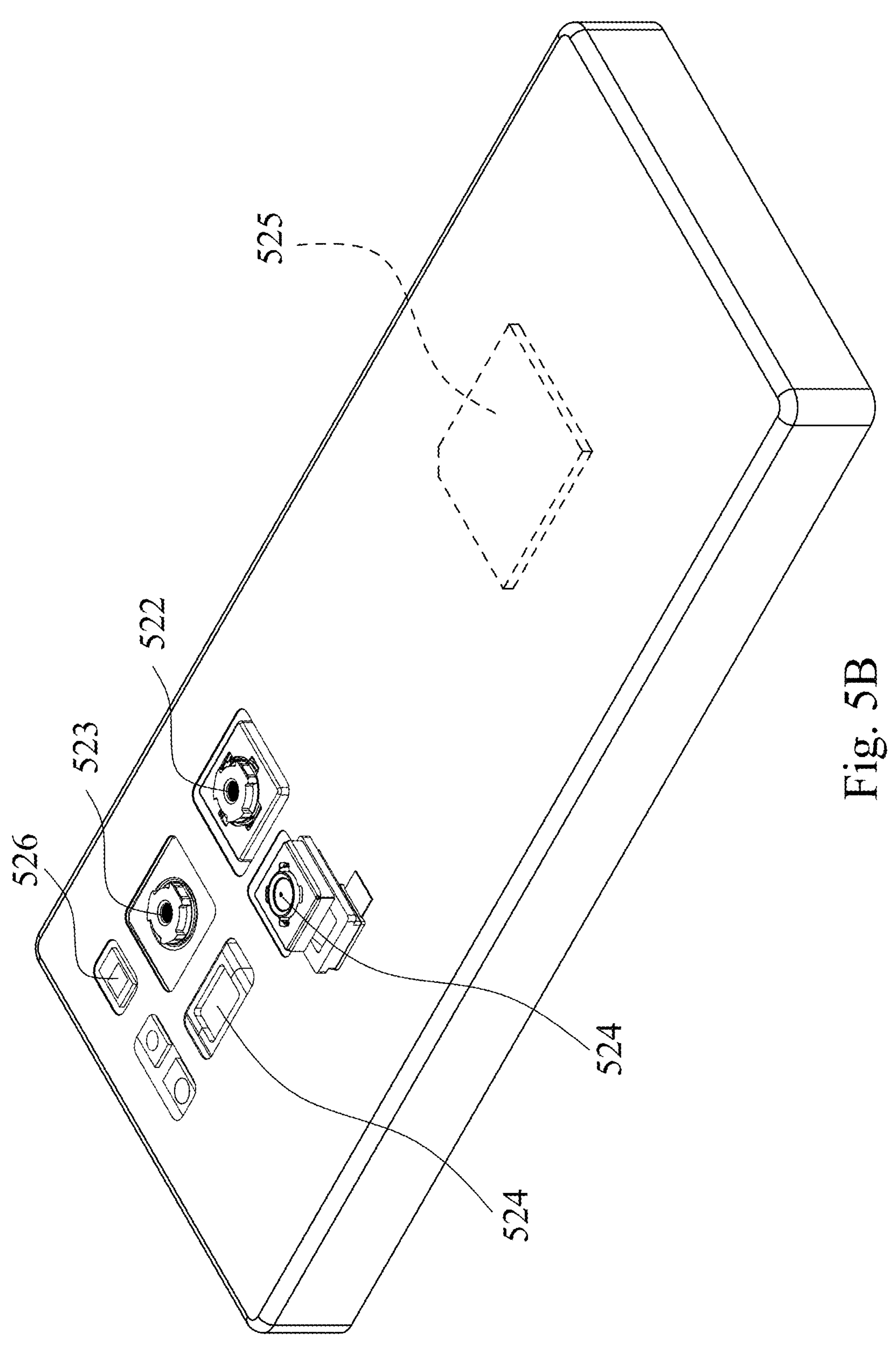
FIG. 5B is another schematic view of the electronic device according to the 5th example of FIG. 5A.

FIG. 5A is a schematic view of an electronic device 50 according to the 5th example of the present disclosure. FIG. 5B is another schematic view of the electronic device 50 according to the 5th example of FIG. 5A. As shown in FIG. 5A and FIG. 5B, the electronic device 50 is a smartphone. The electronic device 50 includes an imaging lens assembly and a user interface 521. Further, the imaging lens assembly is an ultra-wide-angle imaging lens assembly 522, a high-pixel imaging lens assembly 523 and a telephoto imaging lens assembly 524, and the user interface 521 is a touch screen, but the present disclosure is not limited thereto. Furthermore, the imaging lens assembly can be the imaging lens assembly according to any one of the 1st example to the 4th example, but the present disclosure is not limited thereto.

The user interface 521 has a touch function, and the user can activate the capturing mode by the user interface 521. The user interface 521 is for displaying a screen, and the shooting angle can be manually adjusted to switch between different imaging lens assembly. At this moment, an imaging light of the imaging lens assembly is converged on an image sensor (not shown), and electronic signals associated with an image are output to an image signal processor (ISP) 525.

As shown in FIG. 5B, according to the camera specifications of the electronic device 50, the electronic device 50 can further include an optical anti-shake mechanism (not shown). Further, the electronic device 50 can further include at least one focusing assisting module (its reference numeral is omitted) and at least one sensing component (not shown). The focusing assisting module can be a flash module 526, an infrared distance measurement component, a laser focus module, etc. The flash module 526 is for compensating the color temperature. The sensing component can have functions for sensing physical momentum and kinetic energies, such as an accelerator, a gyroscope, and a Hall effect element, so as to sense shaking or jitters applied by hands of the user or external environments. Therefore, the autofocus function and the optical anti-shake mechanism of the imaging lens assembly disposed on the electronic device 50 can function to obtain a great imaging quality and facilitate the electronic device 50 according to the present disclosure to have a capturing function with multiple modes, such as taking optimized selfies, high dynamic range (HDR) with a low light source, 4K resolution recording, etc. Further, the user can visually see the captured image of the camera through the user interface 521 and manually operate the view finding range on the user interface 521 to achieve the auto focus function of what you see is what you get.

Furthermore, the imaging lens assembly, the optical anti-shake mechanism, the sensing component and the focusing assisting module can be disposed on a flexible printed circuit board (FPC) (not shown) and electrically connected to the image signal processor 525 and so on via a connector (not shown) so as to operate a picturing process. Recent electronic devices such as smartphones have a trend towards thinness and lightness. The imaging lens assembly and related elements are disposed on the flexible printed circuit board, and circuits are assembled into a main board of the electronic device by the connector. Hence, it can fulfill a mechanical design of a limited inner space of the electronic device and a requirement of a circuit layout and obtain a larger allowance, and it is also favorable for an autofocus function of the imaging lens assembly obtaining a flexible control via a touch screen of the electronic device. In the 5th example, the electronic device 50 can include a plurality of the sensing components and a plurality of focusing assisting modules, and the sensing components and the focusing assisting modules are disposed on the flexible printed circuit board and another at least one flexible printed circuit board (not shown) and electrically connected to the image signal processor 525 and so on via corresponding connectors so as to operate the picturing process. In other examples (not shown), the sensing components and auxiliary optical elements can be disposed on the main board of the electronic device or a board of the other form according to the mechanical design and the requirement of the circuit layout.

Moreover, the electronic device 50 can further include, but not be limited to, a display, a control unit, a storage unit, a random-access memory (RAM), a read-only memory (ROM), or the combination thereof.

Figure 5C:
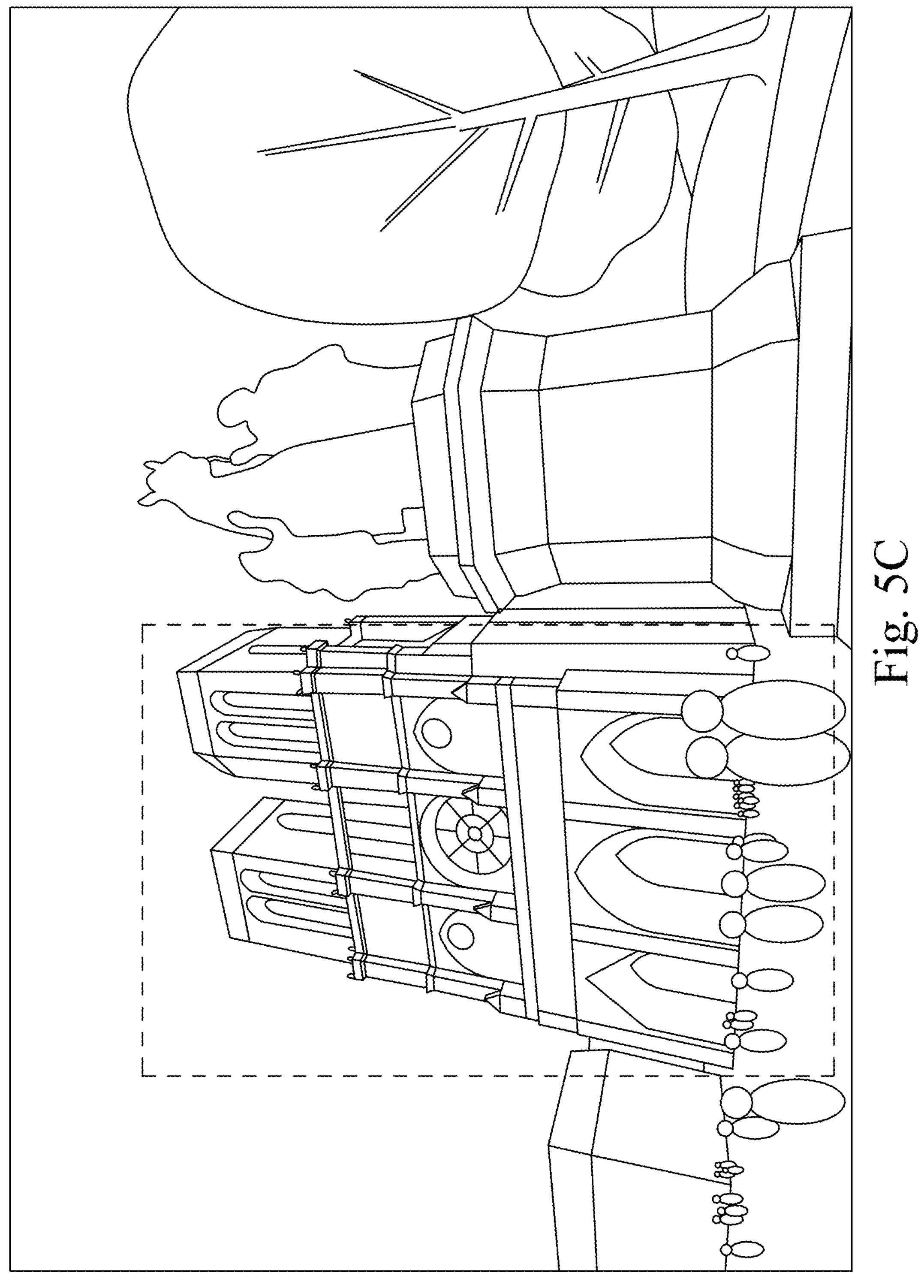
FIG. 5C is a schematic view of an image captured via the electronic device according to the 5th example of FIG. 5A.

FIG. 5C is a schematic view of an image captured via the electronic device 50 according to the 5th example of FIG. 5A. As shown in FIG. 5C, a larger ranged image can be captured via the ultra-wide-angle imaging lens assembly 522, and the ultra-wide-angle imaging lens assembly 522 has a function for containing more views.

Figure 5D:
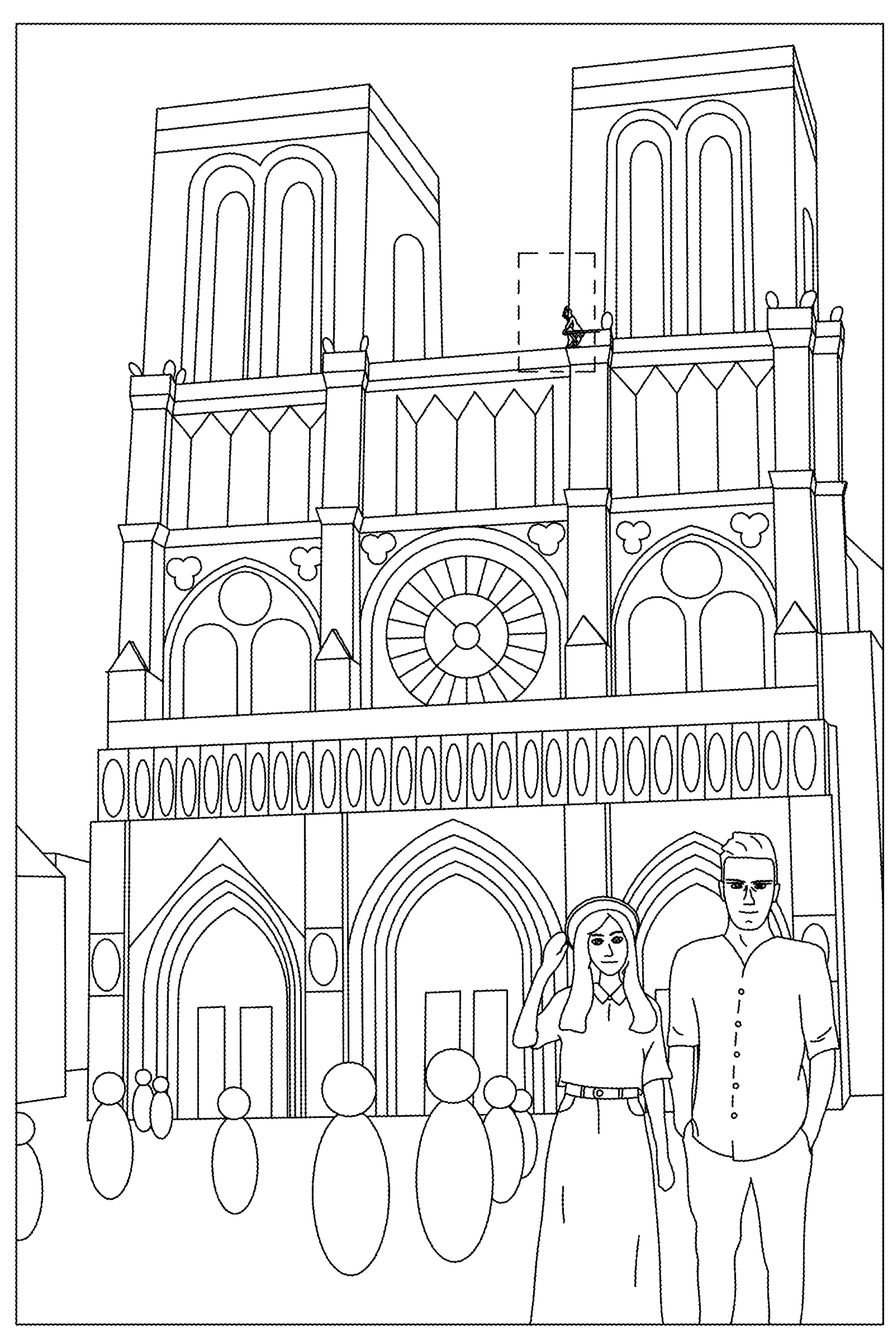
FIG. 5D is another schematic view of the image captured via the electronic device according to the 5th example of FIG. 5A.

FIG. 5D is another schematic view of the image captured via the electronic device 50 according to the 5th example of FIG. 5A. As shown in FIG. 5D, a certain ranged and high-pixel image can be captured via the high-pixel imaging lens assembly 523, and the high-pixel imaging lens assembly 523 has a function for high resolution and low distortion.

Figure 5E:
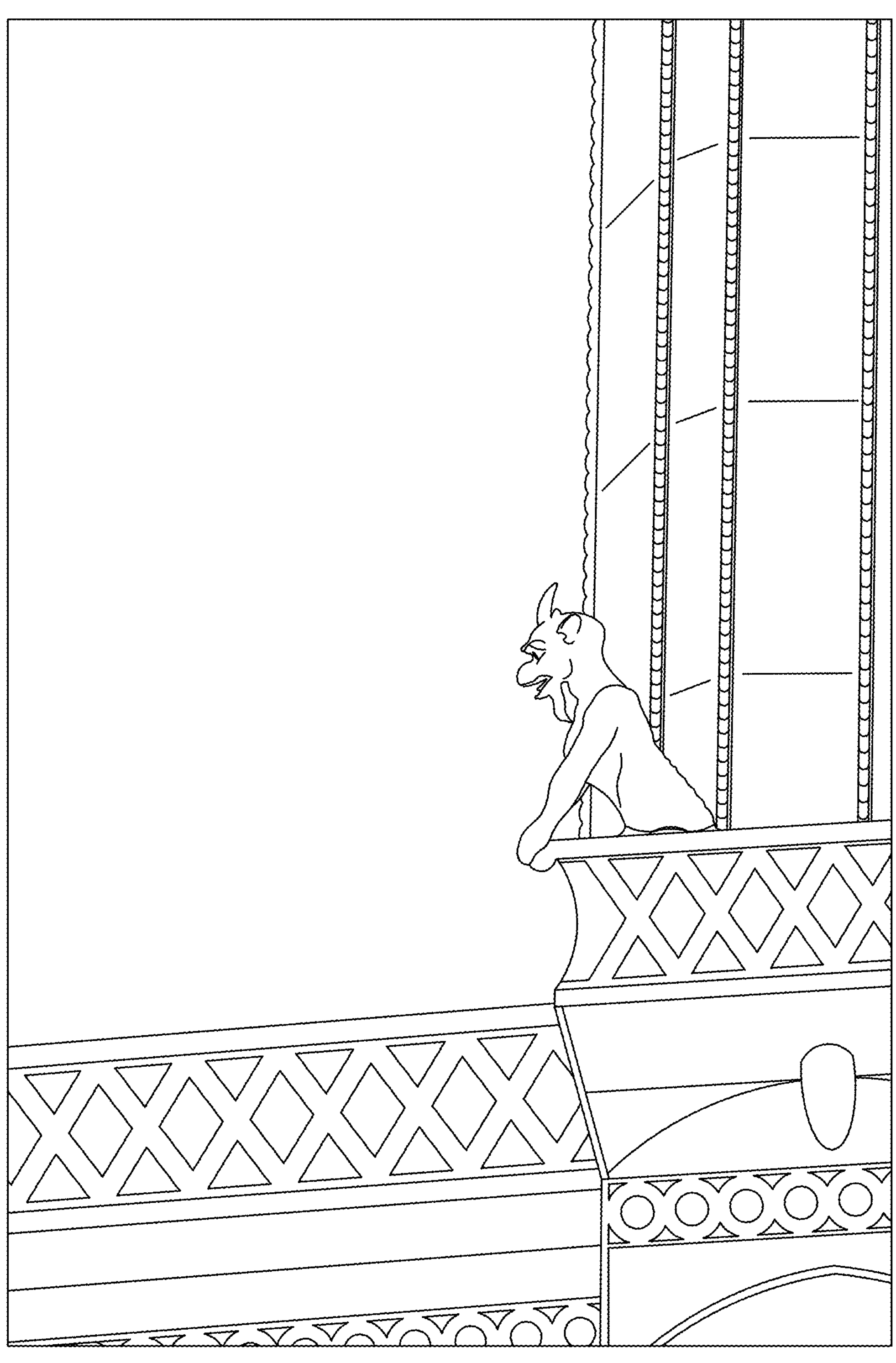
FIG. 5E is still another schematic view of the image captured via the electronic device according to the 5th example of FIG. 5A.

FIG. 5E is still another schematic view of the image captured via the electronic device 50 according to the 5th example of FIG. 5A. As shown in FIG. 5E, the telephoto imaging lens assembly 524 has a function for a high magnification, and a far image can be captured and enlarged to a high magnification via the telephoto imaging lens assembly 524.

As shown in FIG. 5C to FIG. 5E, when an image is captured via the imaging lens assembly having various focal lengths and processed via a technology of an image processing, a zoom function of the electronic device 50 can be achieved.

6th Example

Figure 6:
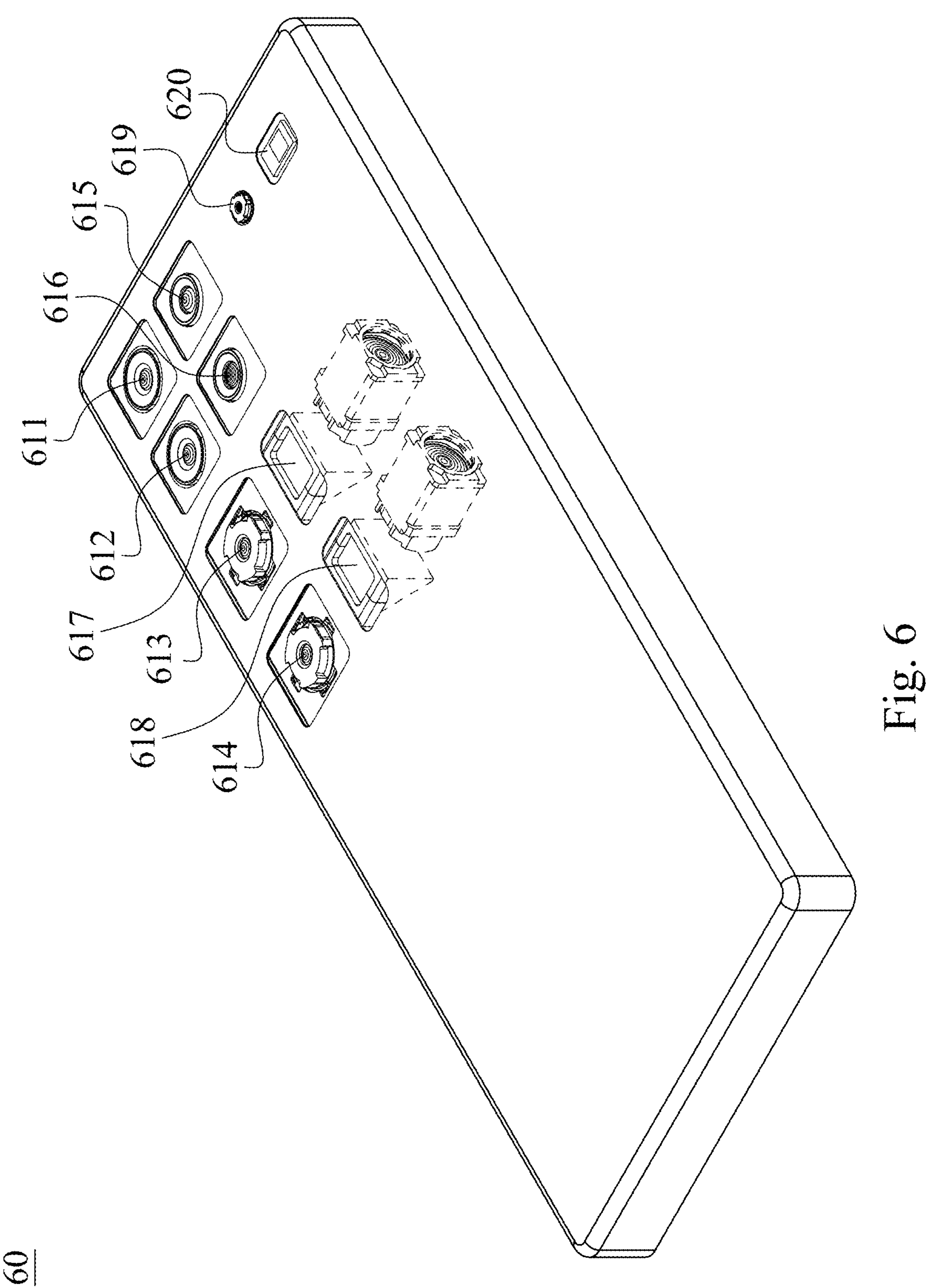
FIG. 6 is a schematic view of an electronic device according to the 6th example of the present disclosure.

FIG. 6 is a schematic view of an electronic device 60 according to the 6th example of the present disclosure. As shown in FIG. 6, the electronic device 60 is a smartphone, and the electronic device 60 includes an imaging lens assembly. Further, the imaging lens assembly is ultra-wide-angle imaging lens assemblies 611, 612, wide-angle imaging lens assemblies 613, 614, telephoto imaging lens assemblies 615, 616, 617, 618, and a Time-Of-Flight (TOF) module 619. The Time-Of-Flight module 619 can be other types of imaging lens assembly, and the present disclosure is not limited thereto. Specifically, the imaging lens assembly can be the imaging lens assembly according to any one of the 1st example to the 4th example, but the present disclosure is not limited thereto.

Furthermore, the telephoto imaging lens assemblies 617, 618 are for folding a light path, but the present disclosure is not limited thereto.

According to the camera specifications of the electronic device 60, the electronic device 60 can further include an optical anti-shake mechanism (not shown). Further, the electronic device 60 can further include at least one focusing assisting module (its reference numeral is omitted) and at least one sensing component (not shown). The focusing assisting module can be a flash module 620, an infrared distance measurement component, a laser focus module, etc. The flash module 620 is for compensating the color temperature. The sensing component can have functions for sensing physical momentum and kinetic energies, such as an accelerator, a gyroscope, and a Hall effect element, so as to sense shaking or jitters applied by hands of the user or external environments. Therefore, the autofocus function and the optical anti-shake mechanism of the imaging lens assembly disposed on the electronic device 60 can function to obtain a great imaging quality and facilitate the electronic device 60 according to the present disclosure to have a capturing function with multiple modes, such as taking optimized selfies, high dynamic range (HDR) with a low light source, 4K resolution recording, etc.

Furthermore, all of other structures and dispositions according to the 6th example are the same as the structures and the dispositions according to the 5th example, and will not be described again herein.

7th Example

Figure 7A:
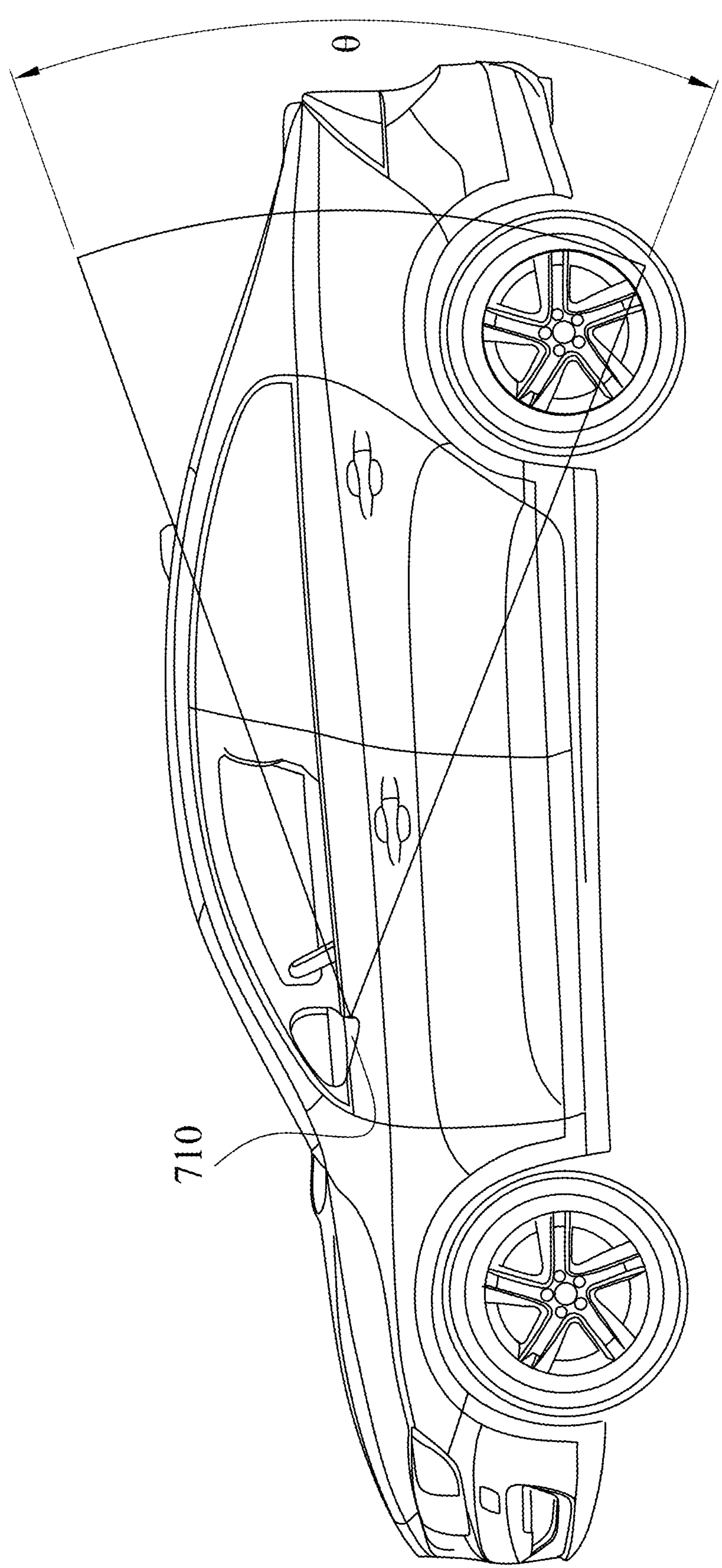
FIG. 7A is a schematic view of a vehicle instrument according to the 7th example of the present disclosure.
Figure 7B:
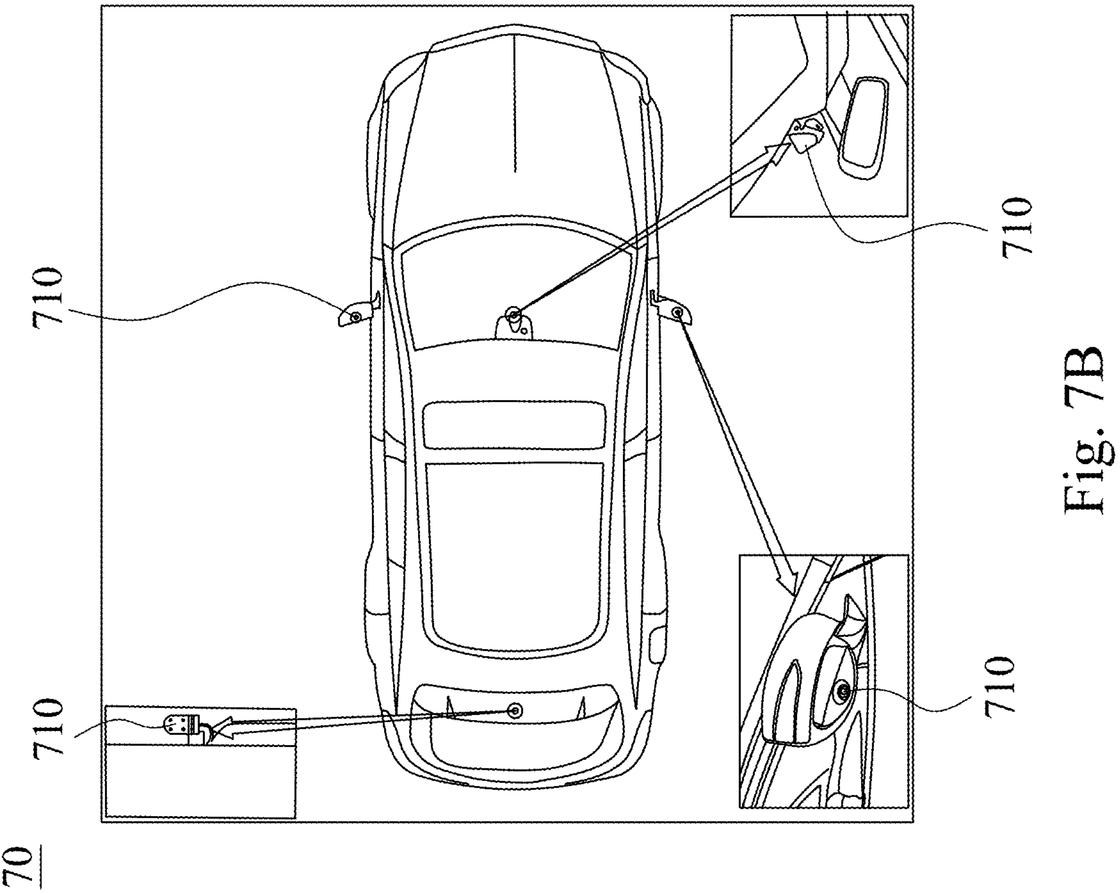
FIG. 7B is another schematic view of the vehicle instrument according to the 7th example of FIG. 7A.
Figure 7C:
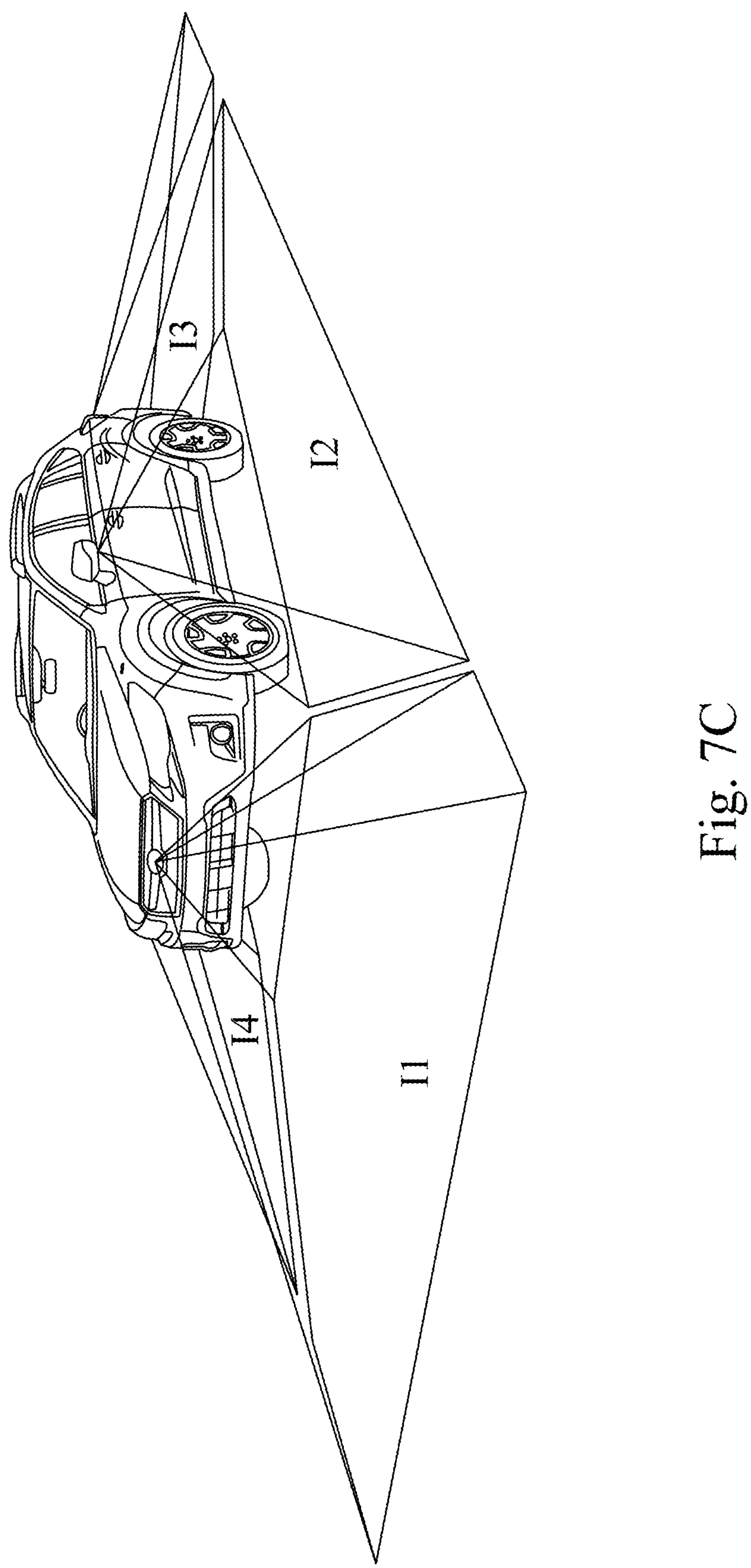
FIG. 7C is still another schematic view of the vehicle instrument according to the 7th example of FIG. 7A.

FIG. 7A is a schematic view of a vehicle instrument 70 according to the 7th example of the present disclosure. FIG. 7B is another schematic view of the vehicle instrument 70 according to the 7th example of FIG. 7A. FIG. 7C is still another schematic view of the vehicle instrument 70 according to the 7th example of FIG. 7A. As shown in FIG. 7A to FIG. 7C, the electronic device (its reference numeral is omitted) is applied to the vehicle instrument 70, and the electronic device includes a plurality of imaging lens assemblies 710. In the 7th example, a number of the imaging lens assemblies 710 is six, and the imaging lens assembly can be the imaging lens assembly according to any one of the 1st example to the 4th example, but the present disclosure is not limited thereto.

As shown in FIG. 7A and FIG. 7B, the imaging lens assemblies 710 are automotive imaging lens assemblies, two of the imaging lens assemblies 710 are located under rearview mirrors on a left side and a right side, respectively, and the aforementioned imaging lens assemblies 710 are configured to capture the image information of a visual angle θ. In particular, the visual angle θ can satisfy the following condition: 40 degrees<θ<90 degrees. Therefore, the image information in the regions of two lanes on the left side and the right side can be captured.

As shown in FIG. 7B, another two of the imaging lens assemblies 710 can be disposed in the inner space of the vehicle instrument 70. In particular, the aforementioned two imaging lens assemblies 710 are disposed on a location close to the rearview mirror inside the vehicle instrument 70 and a location close to the rear car window, respectively. Further, the imaging lens assemblies 710 can be further disposed on the rearview mirrors on the left side and the right side except the mirror surface, respectively, but the present disclosure is not limited thereto.

As shown in FIG. 7C, another two of the imaging lens assemblies 710 can be disposed on a front end of the vehicle instrument 70 and a rear end of the vehicle instrument 70, respectively. By disposing the imaging lens assemblies 710 on the front end and the rear end of the vehicle instrument 70 and under the rearview mirror on the left side of the vehicle instrument 70 and the right side of the vehicle instrument 70, it is favorable for the drivers obtaining the external space information in addition to the driving seat, such as the external space information I1, I2, I3, I4, but the present disclosure is not limited thereto. Therefore, more visual angles can be provided to reduce the blind spot, so that the driving safety can be improved. Further, it is favorable for identifying the real-time traffic information outside the vehicle instrument 70 by disposing the imaging lens assemblies 710 around the vehicle instrument 70, and the automatic assisted driving function can be realized.

The foregoing description, for purpose of explanation, has been described with reference to specific embodiments. It is to be noted that Tables show different data of the different embodiments; however, the data of the different embodiments are obtained from experiments. The embodiments were chosen and described in order to best explain the principles of the disclosure and its practical applications, to thereby enable others skilled in the art to best utilize the disclosure and various embodiments with various modifications as are suited to the particular use contemplated. The embodiments depicted above and the appended drawings are exemplary and are not intended to be exhaustive or to limit the scope of the present disclosure to the precise forms disclosed. Many modifications and variations are possible in view of the above teachings.

What is claimed is:

1. An imaging lens assembly, comprising:

an optical element, comprising:

a substrate, wherein the substrate is made of transparent material;

a nanostructure layer disposed on a surface of the substrate, wherein a main component of the nanostructure layer is an aluminum oxide, the nanostructure layer has a plurality of ridge-like protrusions which extend non-directionally, a bottom of each of the ridge-like protrusions is closer to the substrate than a top of each of the ridge-like protrusions to the substrate, and each of the ridge-like protrusions is gradually tapered from the bottom to the top; and an intermediate layer disposed between the substrate and the nanostructure layer, wherein the intermediate layer comprises:

a first film, wherein a main component of the first film is a silicon dioxide; and a plurality of second films, wherein a main component of each of the second films is the silicon dioxide, and the second films are stacked with the first film;

wherein a thickness of the first film is Tf1, a thickness of each of the second films is Tf2, a thickness of the intermediate layer is Ti, and the following conditions are satisfied:

$$Tf2 < Tf1;$$

$$45\ \text{nm} < Tf1 < 180\ \text{nm; and}$$

$$101\ \text{nm} < Ti < 450\ \text{nm}.$$

2. The imaging lens assembly of claim 1, wherein the thickness of the first film is Tf1, and the following condition is satisfied:

$$50\ \text{nm} < Tf1 < 120\ \text{nm}.$$

3. The imaging lens assembly of claim 1, wherein the thickness of the first film is Tf1, the thickness of each of the second films is Tf2, and the following condition is satisfied:

$$1.3 < Tf1/Tf2 < 55.$$

4. The imaging lens assembly of claim 1, wherein the thickness of the intermediate layer is Ti, and the following condition is satisfied:

$$110\ \text{nm} < Ti < 330\ \text{nm}.$$

5. The imaging lens assembly of claim 1, wherein an average reflectivity of the optical element corresponding to a light with a wavelength from 450 nm to 600 nm is R0, and the following condition is satisfied:

$R0<0.65\%$.

6. The imaging lens assembly of claim 5, wherein the average reflectivity of the optical element corresponding to the light with the wavelength from 450 nm to 600 nm is R0, an average reflectivity of the optical element corresponding to the light with the wavelength from 450 nm to 600 nm after the optical element is placed in an environment with a temperature of 85° C. and a relative humidity of 85% for 1000 hours is R1000, and the following condition is satisfied:

$$1.05 < R1000/R0 < 15.$$

7. The imaging lens assembly of claim 1, wherein the bottom of each of the ridge-like protrusions is physically contacted with the intermediate layer, and a main component of the ridge-like protrusions is different from a main component of the intermediate layer.

8. The imaging lens assembly of claim 7, wherein a partial area of a top portion of the intermediate layer is contacted with an air.

9. The imaging lens assembly of claim 1, wherein an average structural height of the nanostructure layer is Havg, and the following condition is satisfied:

$$70\ \text{nm} < Havg < 350\ \text{nm}.$$

10. The imaging lens assembly of claim 1, wherein the optical element is a lens element, and the imaging lens assembly further comprises:

a lens element set, wherein the optical element is closer to an object-side end or an image-side end than the lens element set to the object-side end or the image-side end.

11. The imaging lens assembly of claim 10, further comprising:

a light path folding element, wherein the optical element is closer to the light path folding element than the lens element set to the light path folding element.

12. The imaging lens assembly of claim 10, wherein the substrate of the optical element comprises:

an optical effective portion having refractive power; and a peripheral portion disposed around the optical effective portion;

wherein a thickness of the intermediate layer corresponding to the optical effective portion is larger than a thickness of the intermediate layer corresponding to the peripheral portion.

13. An electronic device, comprising:

the imaging lens assembly of claim 1.

14. An imaging lens assembly, comprising:

an optical element, comprising:

a substrate, wherein the substrate is made of transparent material;

a nanostructure layer disposed on a surface of the substrate, wherein a main component of the nanostructure layer is an aluminum oxide, the nanostructure layer has a plurality of ridge-like protrusions which extend non-directionally, a bottom of each of the ridge-like protrusions is closer to the substrate than a top of each of the ridge-like protrusions to the substrate, and each of the ridge-like protrusions is gradually tapered from the bottom to the top; and an intermediate layer disposed between the substrate and the nanostructure layer, wherein the intermediate layer comprises:

a plurality of films, wherein a main component of each of the films is a silicon dioxide, and the films are stacked adjacent to each other;

wherein a thickness of the intermediate layer is Ti, and the following condition is satisfied:

$$101\ \text{nm} < Ti < 450\ \text{nm}.$$

15. The imaging lens assembly of claim 14, wherein an average reflectivity of the optical element corresponding to a light with a wavelength from 450 nm to 600 nm is R0, and the following condition is satisfied:

$R0<0.65\%$.

16. The imaging lens assembly of claim 15, wherein the average reflectivity of the optical element corresponding to the light with the wavelength from 450 nm to 600 nm is R0, an average reflectivity of the optical element corresponding to the light with the wavelength from 450 nm to 600 nm after the optical element is placed in an environment with a temperature of 85° C. and a relative humidity of 85% for 1000 hours is R1000, and the following condition is satisfied:

$$1.05 < R1000/R0 < 15.$$

17. The imaging lens assembly of claim 14, wherein the thickness of the intermediate layer is Ti, and the following condition is satisfied:

$$110 \text{ nm} < Ti < 330 \text{ nm}.$$

18. The imaging lens assembly of claim 14, wherein the bottom of each of the ridge-like protrusions is physically contacted with the intermediate layer, and a main component of the ridge-like protrusions is different from a main component of the intermediate layer.

19. The imaging lens assembly of claim 18, wherein a partial area of a top portion of the intermediate layer is contacted with an air.

20. The imaging lens assembly of claim 14, wherein an average structural height of the nanostructure layer is Havg, and the following condition is satisfied:

$$70 \text{ nm} < Havg < 350 \text{ nm}.$$

21. The imaging lens assembly of claim 14, wherein the optical element is a lens element, and the imaging lens assembly further comprises:

a lens element set, wherein the optical element is closer to an object-side end or an image-side end than the lens element set to the object-side end or the image-side end.

22. The imaging lens assembly of claim 21, further comprising:

a light path folding element, wherein the optical element is closer to the light path folding element than the lens element set to the light path folding element.

23. The imaging lens assembly of claim 21, wherein the substrate of the optical element comprises:

an optical effective portion having refractive power; and a peripheral portion disposed around the optical effective portion;

wherein a thickness of the intermediate layer corresponding to the optical effective portion is larger than a thickness of the intermediate layer corresponding to the peripheral portion.

24. An electronic device, comprising:

the imaging lens assembly of claim 14.

* * * * *